United States Patent
Li Pi Shan et al.

(10) Patent No.: US 8,492,322 B2
(45) Date of Patent: *Jul. 23, 2013

(54) VISCOSITY INDEX IMPROVER FOR LUBRICANT COMPOSITIONS

(75) Inventors: Colin Li Pi Shan, Pearland, TX (US); Roger L. Kuhlman, Lake Jackson, TX (US); Gary L. Rath, Pearland, TX (US); Pamela J. Kenny, Lake Jackson, TX (US); Morgan M. Hughes, Angleton, TX (US); Rongjuan Cong, Lake Jackson, TX (US)

(73) Assignee: Dow Global Technologies, LLC, Midland, MI (US)

( * ) Notice: Subject to any disclaimer, the term of this patent is extended or adjusted under 35 U.S.C. 154(b) by 317 days.

This patent is subject to a terminal disclaimer.

(21) Appl. No.: 12/668,806

(22) PCT Filed: Jul. 11, 2008

(86) PCT No.: PCT/US2008/069802
§ 371 (c)(1),
(2), (4) Date: Jan. 12, 2010

(87) PCT Pub. No.: WO2009/012153
PCT Pub. Date: Jan. 22, 2009

(65) Prior Publication Data
US 2010/0197541 A1    Aug. 5, 2010

Related U.S. Application Data

(60) Provisional application No. 60/949,702, filed on Jul. 13, 2007.

(51) Int. Cl.
*C10M 143/00* (2006.01)

(52) U.S. Cl.
USPC ...................................................... 508/591

(58) Field of Classification Search
USPC ...................................................... 508/591
See application file for complete search history.

(56) References Cited

U.S. PATENT DOCUMENTS

| | | |
|---|---|---|
| 4,507,515 A | 3/1985 | Johnston et al. |
| 4,762,890 A | 8/1988 | Strait et al. |
| 4,792,595 A | 12/1988 | Cozewith et al. |
| 4,900,461 A | 2/1990 | Ver Strate et al. |
| 4,927,888 A | 5/1990 | Strait et al. |
| 4,950,541 A | 8/1990 | Tabor et al. |
| 5,401,427 A | 3/1995 | Chung et al. |
| 5,798,420 A | 8/1998 | Cozewith et al. |
| 6,268,444 B1 | 7/2001 | Klosin et al. |
| 6,953,764 B2 | 10/2005 | Frazier et al. |
| 7,053,153 B2 | 5/2006 | Schauder |
| 7,608,668 B2 | 10/2009 | Li Pi Shan et al. |
| 7,714,071 B2 | 5/2010 | Hoenig et al. |
| 2003/0004268 A1 | 1/2003 | Sundararaj et al. |
| 2003/0204017 A1 | 10/2003 | Stevens et al. |
| 2004/0010103 A1 | 1/2004 | Boussie et al. |
| 2006/0199744 A1* | 9/2006 | Walton et al. .............. 508/110 |
| 2006/0199930 A1 | 9/2006 | Li Pi Shan et al. |
| 2006/0211819 A1 | 9/2006 | Hoenig et al. |
| 2010/0197540 A1 | 8/2010 | Shan et al. |
| 2010/0197864 A1 | 8/2010 | Li Pi Shan et al. |
| 2010/0197880 A1 | 8/2010 | Shan et al. |

FOREIGN PATENT DOCUMENTS

| | | |
|---|---|---|
| EP | 1178102 A1 | 2/2002 |
| WO | 9216567 A1 | 10/1992 |
| WO | 9216568 A1 | 10/1992 |
| WO | 03040195 | 5/2003 |
| WO | 03/051935 A1 | 6/2003 |
| WO | 2004024740 | 3/2004 |
| WO | 2005/090425 A1 | 9/2005 |
| WO | 2005/090426 A1 | 9/2005 |
| WO | 2005/090427 A1 | 9/2005 |
| WO | 2006/102146 A2 | 9/2006 |
| WO | 2006/102153 A1 | 9/2006 |

OTHER PUBLICATIONS

US file history for US Patent Application Publication No. 2010-0197540.
US file history for US Patent Application Publication No. 2010-0197864.
US file history for US Patent Application Publication No. 2010-0197880.
Arriola et al., "Catalytic Production of Olefin Block Coplymers via Chain Shuttling Polymerization", Science, 312 (2006).
International Search Report and Written Opinion issued in PCT/US08/069802, dated Jul. 11, 2008.

* cited by examiner

Primary Examiner — Taiwo Oladapo

(57) ABSTRACT

A lubricant composition comprises a base oil and a viscosity modifier including an ethylene/α-olefin interpolymer. The ethylene/α-olefin interpolymer is a block copolymer having at least a hard block and at least a soft block. The soft block comprises a higher amount of comonomers than the hard block. The block copolymer has a number of unique characteristics disclosed here. Such block copolymers offer the possibility of improved low temperature performance and flexibility in formulating motor oil, gear lubricants and greases, etc.

15 Claims, No Drawings

VISCOSITY INDEX IMPROVER FOR LUBRICANT COMPOSITIONS

CROSS REFERENCE TO RELATED APPLICATIONS

This application claims priority to U.S. Provisional Application No. 60/949,702, having filed on Jul. 13, 2007, which is herein incorporated by reference in its entirety. This application is related to the following US applications, all filed provisionally and concurrently with this application and having: Ser. No. 60/949,698; Ser. No. 60/949,690; and Ser. No. 60/949,670 all of which are herein incorporated by reference.

FIELD OF THE INVENTION

This invention relates to lubricant compositions including a base oil and a viscosity index improver comprising low melt temperature ethylene/α-olefin interpolymers.

BACKGROUND OF THE INVENTION

The yearly economic losses related to friction and abrasion are estimated to be about 2-7% of the GDP in developed countries including the United States and European countries. A report by the U.S. Department of Energy in 1999 indicated that by adopting various measures to reduce friction and abrasion, motor vehicles and transmission systems in the United Sates save 120 billion US dollars each year. One of those measures includes the application of lubricant compositions in motor vehicles and industrial equipments.

Modern lubricant compositions are widely used in various applications such as motor oils, transmission fluids, gear oils, power steering fluids, shock absorber fluids, brake fluids, hydraulic fluids and greases. The lubricant compositions can have various functions such as (1) controlling friction between surfaces of moving parts; (2) reducing wear of moving parts; (3) reducing corrosion of surfaces of moving parts, particularly metal surfaces; (4) damping mechanical shock in gears; and (5) forming a seal on the walls of engine cylinders. Each lubricant composition can contain a base oil and, depending on the application, a combination of additives or modifiers, such as viscosity index improvers, pour point depressants, dispersants, detergents, anti-wear agents, anti-oxidants, friction modifiers, rust inhibitors, corrosion inhibitors, demulsifiers and anti-foams.

In general, semi-crystalline random copolymers (with 60-70 wt % $C_2$, 100-133 $CH_3/1000C$'s) have higher thickening efficiency and higher shear stability due to the lower levels of short chain branching when compared to an amorphous random copolymer (40-50 wt % $C_2$, 166-200 $CH_3/1000C$'s). This suggests that a linear backbone with a minimal amount of side branching is required to achieve high thickening efficiency and shear stability for a polyolefin in an oil solution.

However at low temperature, the waxy components that are present in the oil (such as waxy paraffins) will make the oil stop flowing at a higher temperature than its cold use temperature (e.g. −15° C. for Exxon 100LP base oil). The freezing of oil at cold temperatures (−30 to −35° C.) can cause catastrophic engine failure due to oil pan starvation and filter clogging. To prevent this, pour point depressants can be added to modify the structure of the waxy oils so that, as the oil cools, the wax does not form a structure that would otherwise trap the rest of the oil and so prevent flow or block filters. Examples of pour point depressants include polyalkylacrylates, long chain alkyl phenols and phthalic-acid dialkylarylesters, ethylene-butadiene, alpha olefin copolymers with 6-24 carbon atoms (e.g. 1-hexane and 1-octadecane). The principle of oil wax modification is described, for example, in Ashbaugh, H. S.; Radulescu, A.; Prud'homme, R.; Schwahn, D.; Richeter, D.; Fetters, L.; Macromolecules, 35, 7044-7053 (2002); and, Klamann, D.; Lubricants and Related Products, Verlag Chemie, 1984 pp 185-203.

To be successful, an oil viscosity modifier must have compatibility in a wide range of oil base stocks (paraffinic, napthalenic, aromatic) and give a balance of performance over a wide range of conditions (shear and temperature).

Semi-crystalline random copolymers are difficult to formulate to obtain robust performance at low temperature (insufficient wax modification capability). Thus, amorphous copolymers are preferred as they are completely soluble in oil at low temperature and the action of the pour point depressant (already present in the formulated oil) is enough to modify the wax and maintain the pourability of the oil. In this particular case, the amorphous copolymer is added to increase the viscosity of the oil at high temperature The viscosity index is commonly used as a measure of the rate of change of viscosity of a fluid with temperature. This temperature dependency is common to all fluids including base oils. In general, the higher the viscosity index, the smaller is the relative change in viscosity with temperature. The viscosity index (VI) improver or viscosity modifier is used to reduce the temperature dependency of the viscosity of the lubricant compositions so that the lubricant compositions can be used over a wide temperature range. In the other words, the VI improvers prevent the lubricant compositions from becoming too thin at a high temperature, e.g., hot summer temperatures, and too viscous at a low temperature, e.g., cold winter temperatures. Some known VI improvers include polymethacrylates, olefin copolymers, such as ethylene-propylene copolymers and ethylene-propylene diene-modified copolymers (EPDMs), and hydrogenated styrenic block copolymers such as styrene-ethylene/butylene-styrene copolymer (SEBS).

The hydrogenated styrenic block copolymers generally offer good thickening efficiency and excellent low temperature performance. However, these hydrogenated styrenic block copolymers are relatively expensive and have a limited useful life because of their low shear stability.

The olefin copolymers, such as amorphous ethylene-propylene copolymers, may offer good low temperature performance but poor thickening efficiency at high temperatures. The comonomer units of olefin copolymers can be distributed in a tapered manner. Generally, the tapered olefin copolymers, such as tapered ethylene-propylene copolymer, are excellent thickeners, have improved low temperature performance, and are able to avoid undesirable interactions with the base oils.

Although there are many VI improvers available in the market for formulating lubricant compositions, there is always a need for new VI improvers for lubricant compositions with improved properties and flexibilities. In particular, it is desirable that VI improvers lend low turbidity to a lubricant composition and lend a low pour point.

SUMMARY OF INVENTION

The invention provides lubricant compositions comprising (i) a base oil; and (ii) an ethylene/α-olefin interpolymer comprising two or more substantially homogeneous intramolecular segments or blocks comprising differing chemical or physical properties, said intramolecular segments characterized by possessing a most probable molecular weight distribution, wherein the ethylene/α-olefin interpolymer comprises a hard segment and a soft segment, and:
(a) has a Mw/Mn from about 1.7 to about 3.5;
(b) has an ethylene content in the hard segment in the range of from 60 wt % to 95 wt % based on based on total monomer content in hard segment;
(c) (i) has a hard segment composition of at least 40%, at least one melting point, Tm, in degrees Celsius and an amount of ethylene in weight percent, wt % $C_2$, wherein the numerical values of Tm and wt % $C_2$ correspond to the relationship:

$$90°\,C. \geq Tm \geq 4.1276(\text{wt \% } C_2) - 244.76;$$

or (ii) has a hard segment composition of less than 40%, at least one melting point, Tm, in degrees Celsius and an amount of ethylene in weight percent, wt % $C_2$, wherein the numerical values of Tm and wt % $C_2$ correspond to the relationship:

$$80°\,C. \geq Tm \leq 4.1276(\text{wt \% } C_2) - 264.95;$$

or (iii) is characterized by an average block index greater than zero and up to about 1.0 and a molecular weight distribution, $M_w/M_n$, greater than about 1.3; or
(iv) has a molecular fraction which elutes between 0° C. and 130° C. when fractionated using low temperature TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or
(v) has a relationship between ethylene content in wt % and log molecular weight such that a line plotted of ethylene content vs log molecular weight as measured by GPC-IR has an absolute slope, m, of equal to or less than 4; and,
(d) has a turbidity measurement of a 1.0 wt % solution of the ethylene/α-olefin interpolymer in oil or a 1.5 wt % solution in dodecane of less than or equal to that of a comparable copolymer wherein the comparable copolymer has the same DSC enthalpy (J/g) at greater than 55° C. within ±5 J/g and the same overall ethylene content within 10%.

The invention also provides an ethylene/α-olefin interpolymer comprising two or more substantially homogeneous intramolecular segments or blocks comprising differing chemical or physical properties, said intramolecular segments characterized by possessing a most probable molecular weight distribution, wherein the ethylene/α-olefin interpolymer comprises a hard segment and a soft segment, and wherein:
(a) has a Mw/Mn from about 1.7 to about 3.5;
(b) has an ethylene content in the hard segment in the range of from 60 wt % to 95 wt % based on based on total monomer content in hard segment;
(c) (i) has a hard segment in an amount of at least 40%, at least one melting point, Tm, in degrees Celsius and an amount of ethylene in weight percent, wt % $C_2$, wherein the numerical values of Tm and wt % $C_2$ correspond to the relationship:

$$0°\,C. \geq Tm \geq 3.4405(\text{wt \% } C_2) - 218.99;$$

or (ii) has a hard segment composition of less than 40%, at least one melting point, Tm, in degrees Celsius and an amount of ethylene in weight percent, wt % $C_2$, wherein the numerical values of Tm and wt % $C_2$ correspond to the relationship:

$$80°\,C. \geq Tm \leq 4.1276(\text{wt \% } C_2) - 264.95;$$

or (iii) is characterized by an average block index greater than zero and up to about 1.0 and a molecular weight distribution, $M_w/M_n$, greater than about 1.3; or
(iv) has a molecular fraction which elutes between 0° C. and 130° C. when fractionated using low temperature TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or
(v) has a relationship between ethylene content in wt % and log molecular weight such that a line plotted of ethylene content vs log molecular weight as measured by GPC-IR has an absolute slope, m, of equal to or less than 4; and,
(d) has a turbidity measurement of a 1.0 wt % solution of the ethylene/α-olefin interpolymer in oil or a 1.5 wt % solution in dodecane of less than or equal to that of a comparable copolymer wherein the comparable copolymer has the same DSC enthalpy (J/g) at greater than 55° C. within ±5 J/g and the same overall ethylene content within 10%.

The ethylene/α-olefin interpolymer can have one or any combination of the above characteristics.

In one embodiment, the ethylene/α-olefin interpolymer has (a) at least one molecular fraction which elutes between 40° C. and 130° C. when fractionated using TREF, characterized in that the fraction has a block index of at least 0.5 and up to about 1 and a molecular weight distribution, Mw/Mn, greater than about 1.3 or (b) an average block index greater than zero and up to about 1.0 and a molecular weight distribution, Mw/Mn, greater than about 1.3.

In another embodiment, the ethylene/α-olefin interpolymer has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer.

In one embodiment, the ethylene/α-olefin interpolymer is a random block copolymer comprising at least a hard block and at least a soft block. Further, the random block copolymer can comprise multiple hard blocks and multiple soft blocks, and the hard blocks and soft blocks can be randomly distributed in a polymeric chain.

In one embodiment, the α-olefin used in the ethylene/α-olefin interpolymer is styrene, propylene, 1-butene, 1-hexene, 1-octene, 4-methyl-1-pentene, norbornene, 1-decene, 1,5-hexadiene, or a combination thereof.

In another embodiment, the ethylene/α-olefin interpolymer has a melt index in the range of about 0.1 to about 2000 g/10 minutes, about 2 to about 1500 g/10 minutes, about 2 to about 1000 g/10 minutes or about 2 to about 500 g/10 minutes measured according to ASTM D-1238, Condition 190° C./2.16 kg.

In one embodiment, the lubricant compositions comprise the base oil selected from a group consisting of the base stocks of API Groups I, II, III, IV and V and combinations thereof. In one embodiment, the base oil is a natural oil, a synthetic oil or a combination thereof.

The lubricant composition can further comprise at least an additive, such as a detergent, a dispersant, a friction modifier, a pour point depressant, a demulsifier, an anti-foam, a corrosion inhibitor, an anti-wear agent, an antioxidant, a rust inhibitor, a thickener or a combination thereof.

In one embodiment, the lubricant composition is a motor oil, a transmission fluid, a gear oil, a power steering fluid, a shock absorber fluid, a brake fluid, a hydraulic fluid or a grease. The motor oil can further comprise a pour point depressant, a detergent, a dispersant, an anti-wear, an antioxidant, a friction modifier, a rust inhibitor or a combination thereof.

In another embodiment, the lubricant composition is a transmission fluid. The transmission fluid can further comprise a friction modifier, a detergent, a dispersant, an antioxidant, an anti-wear agent, an extreme pressure agent, a pour point depressant, an anti-foam, a corrosion inhibitor or a combination thereof.

In one embodiment, the lubricant composition is a gear oil. The gear oil can further comprise an anti-wear, an extreme pressure agent, a rust inhibitor or a combination thereof.

In another embodiment, the lubricant composition is a grease. The grease can further comprise a thickener, a complexing agent, an antioxidant, an anti-wear agent, an extreme pressure agent, an anti-foam, a corrosion inhibitor or a mixture thereof.

Also provided are methods of making the lubricant composition, comprising blending a base oil with an ethylene/α-olefin interpolymer, wherein the ethylene/α-olefin interpolymer is as described above and elsewhere herein.

Additional aspects of the invention and characteristics and properties of various embodiments of the invention will become apparent with the following description.

BRIEF DESCRIPTION OF THE DRAWING

The FIGURE shows a plot of $T_m$ vs wt % $C_2$ for hard segment majority copolymers of the invention and for Comparative Examples.

DETAILED DESCRIPTION OF THE INVENTION

General Definitions

"Polymer" means a polymeric compound prepared by polymerizing monomers, whether of the same or a different type. The generic term "polymer" embraces the terms "homopolymer," "copolymer," "terpolymer" as well as "interpolymer."

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "ethylene/α-olefin interpolymer" generally refers to polymers comprising ethylene and an α-olefin having 3 or more carbon atoms. Preferably, ethylene comprises the majority mole fraction of the whole polymer, i.e., ethylene comprises at least about 50 mole percent of the whole polymer. More preferably ethylene comprises at least about 60 mole percent, at least about 70 mole percent, or at least about 80 mole percent, with the substantial remainder of the whole polymer comprising at least one other comonomer that is preferably an α-olefin having 3 or more carbon atoms. For many ethylene/propylene copolymers, the preferred composition comprises an ethylene content in the range of from about 55 wt % to about 75 wt %, preferably in the range of from about 60 wt % to about 73 wt %, based on the weight of the polymer. In some embodiments, the ethylene/α-olefin interpolymers do not include those produced in low yields or in a minor amount or as a by-product of a chemical process. While the ethylene/α-olefin interpolymers can be blended with one or more polymers, the as-produced ethylene/α-olefin interpolymers are substantially pure and often comprise a major component of the reaction product of a polymerization process.

The terms "pseudo-block copolymer" or "block copolymer" refer to a copolymer comprising two or more blocks or segments of differing chemical or physical property, such as variable comonomer content, crystallinity, density, tacticity, regio-error, or other property. Non-adjacent blocks are not necessarily of identical chemical composition, but may vary in one or more of the foregoing respects, from the composition of all other blocks or regions.

The pseudo-block copolymers typically comprise various amounts of "hard" and "soft" segments. "Hard" segments refer to blocks of polymerized units in which ethylene is present in an amount in the range of from about 60 wt % to about 95 wt %, and preferably in the range of from about 70 wt % to about 85 wt %, based on the weight of the polymer. "Soft" segments, on the other hand, refer to blocks of polymerized units in which the comonomer content (content of monomers other than ethylene) is in the range of from about 30 wt % to about 80 wt %, preferably in the range of from about 35 wt % to about 80 wt %, based on the weight of the polymer.

The soft segments can often be present in a block interpolymer from about 1 weight percent to about 99 weight percent of the total weight of the block interpolymer, preferably from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent of the total weight of the block interpolymer. Conversely, the hard segments can be present in similar ranges. The polymer is said to have a hard segment majority when the amount of hard segment present is greater than 40% and a soft segment majority when the amount of hard segment is less than 60%. The soft segment weight percentage and the hard segment weight percentage can be calculated based on data obtained from DSC or NMR. Such methods and calculations are disclosed in U.S. patent application Ser. No. 11/376,835, US Patent Application Publication Number 2006-0199930, entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclosure of which is incorporated by reference herein in its entirety.

The term "crystalline" if employed, refers to a polymer that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetry (DSC) or equivalent technique.

Ethylene/α-olefin interpolymers containing low crystallinity hard blocks are polymers that have hard blocks that have melting points that are less than 100° C. These polymers are particularly useful for oil viscosity modification.

Processes useful for making the polymers have been described in WO2007/035485, which is herein incorporated by reference in its entirety. In particular, the polymers may be made by a process comprising contacting an addition polymerizable monomer or mixture of monomers under addition polymerization conditions with a composition comprising at least one addition polymerization catalyst, a cocatalyst and a chain shuttling agent, said process being characterized by formation of at least some of the growing polymer chains under differentiated process conditions in two or more reactors operating under steady state polymerization conditions or in two or more zones of a reactor operating under plug flow polymerization conditions.

The copolymers of the invention are characterized by unique distributions of polymer polydispersity (PDI or Mw/Mn) and block length distribution, with two or three, preferably two different block compositions. This is due, in a preferred embodiment, to the effect of the use of one or more shuttling agents in combination with a high activity metal complex based polymerization catalyst in two or more polymerization reactors or zones operating under differing polymerization conditions. More specifically, the copolymers of the invention desirably possess PDI from 1.7 to 2.9, preferably from 1.8 to 2.5, more preferably from 1.8 to 2.2, and most preferably from 1.8 to 2.1.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$ wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed.

Disclosed herein are lubricant compositions comprising:
(a) a base oil; and
(b) an ethylene/α-olefin interpolymer comprising two or more substantially homogeneous intramolecular segments or blocks comprising differing chemical or physical properties, said intramolecular segments characterized by possessing a most probable molecular weight distribution, wherein the ethylene/α-olefin interpolymer comprises a hard segment and a soft segment, and:
(a) has a Mw/Mn from about 1.7 to about 3.5;
(b) has an ethylene content in the hard segment in the range of from 60 wt % to 95 wt % based on based on total monomer content in hard segment;
(c) (i) has a hard segment in an amount of at least 40%, at least one melting point, Tm, in degrees Celsius and an amount of ethylene in weight percent, wt % $C_2$, wherein the numerical values of Tm and wt % $C_2$ correspond to the relationship:

$$90° C. \geq Tm \geq 4.1276(\text{wt \% } C_2)-244.76;$$

or (ii) has a hard segment composition of less than 40%, at least one melting point, Tm, in degrees Celsius and an amount of ethylene in weight percent, wt % $C_2$, wherein the numerical values of Tm and wt % $C_2$ correspond to the relationship:

$$80° C. \geq Tm \leq 4.1276(\text{wt \% } C_2)-264.95;$$

or (iii) is characterized by an average block index greater than zero and up to about 1.0 and a molecular weight distribution, $M_w/M_n$, greater than about 1.3; or (iv) has a molecular fraction which elutes between 0° C. and 130° C. when fractionated using low temperature TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (v) has a relationship between ethylene content in wt % and log molecular weight such that a line plotted of ethylene content vs log molecular weight as measured by GPC-IR has an absolute slope, m, of equal to or less than 4; and, (d) has a turbidity measurement of a 1.0 wt % solution of the ethylene/α-olefin interpolymer in oil or a 1.5 wt % solution in dodecane of less than or equal to that of a comparable copolymer wherein the comparable copolymer has the same DSC enthalpy (J/g) at greater than 55° C. within ±5 J/g and the same overall ethylene content within 10%.

In some embodiments, the invention provides an ethylene/α-olefin interpolymer comprising two or more substantially homogeneous intramolecular segments or blocks comprising differing chemical or physical properties, said intramolecular segments characterized by possessing a most probable molecular weight distribution, wherein the ethylene/α-olefin interpolymer comprises a hard segment and a soft segment, and wherein:
(a) has a Mw/Mn from about 1.7 to about 3.5;
(b) has an ethylene content in the hard segment in the range of from 60 wt % to 95 wt % based on based on total monomer content in hard segment;

(c) (i) has a hard segment in an amount of at least 40%, at least one melting point, Tm, in degrees Celsius and an amount of ethylene in weight percent, wt % C$_2$, wherein the numerical values of Tm and wt % C$_2$ correspond to the relationship:

$$0° C. \geq Tm \geq 3.4405(\text{wt \% C}_2)-218.99;$$

or (ii) has a hard segment composition of less than 40%, at least one melting point, Tm, in degrees Celsius and an amount of ethylene in weight percent, wt % C$_2$, wherein the numerical values of Tm and wt % C$_2$ correspond to the relationship:

$$80° C. \geq Tm \leq 4.1276(\text{wt \% C}_2)-264.95;$$

or (iii) is characterized by an average block index greater than zero and up to about 1.0 and a molecular weight distribution, M$_w$/M$_n$, greater than about 1.3; or (iv) has a molecular fraction which elutes between 0° C. and 130° C. when fractionated using low temperature TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (v) has a relationship between ethylene content in wt % and log molecular weight such that a line plotted of ethylene content vs log molecular weight as measured by GPC-IR has an absolute slope, m, of equal to or less than 4; and, (d) has a turbidity measurement of a 1.0 wt % solution of the ethylene/α-olefin interpolymer in oil or a 1.5 wt % solution in dodecane of less than or equal to that of a comparable copolymer wherein the comparable copolymer has the same DSC enthalpy (J/g) at greater than 55° C. within ±5 J/g and the same overall ethylene content within 10%.

In another embodiment, the ethylene/α-olefin interpolymer has a hard segment in an amount of at least 40%, at least one melting point, Tm, in degrees Celsius and an amount of ethylene in weight percent, wt % C$_2$, wherein the numerical values of Tm and wt % C$_2$ correspond to the relationship:

$$0° C. \geq Tm \geq 3.4405(\text{wt \% C}_2)-212.42.$$

Ethylene/α-Olefin Interpolymers

The ethylene/α-olefin interpolymers used in embodiments of the invention (also referred to as "inventive interpolymer" or "inventive polymer") comprise ethylene and one or more copolymerizable α-olefin comonomers in polymerized form, characterized by segments of two or more polymerized monomer units differing in chemical or physical properties (block interpolymer). These pseudo-block copolymers comprise two or more substantially homogeneous intramolecular segments or blocks comprising differing chemical or physical properties, said intramolecular segments characterized by possessing a most probable molecular weight distribution In one aspect, the ethylene/α-olefin interpolymers have a molecular fraction which elutes between 0° C. and 130° C. when fractionated using Temperature Rising Elution Fractionation ("TREF"), characterized in that said fraction has a molar comonomer content higher, preferably at least 5 percent higher, more preferably at least 10 percent higher, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. Preferably, the Mw/Mn of the comparable interpolymer is also within 10 percent of that of the block interpolymer and/or the comparable interpolymer has a total comonomer content within 10 weight percent of that of the block interpolymer.

In some embodiments, the pseudo-block copolymers possess a PDI fitting a Schultz-Flory distribution rather than a Poisson distribution. The copolymers are further characterized as having a polydisperse distribution of block sizes and possessing a most probable distribution of block lengths. Preferred block copolymers are those containing 2 or more blocks or segments including terminal blocks.

Comonomer content may be measured using any suitable technique, with techniques based on nuclear magnetic resonance ("NMR") spectroscopy preferred. Moreover, for polymers or blends of polymers having relatively broad TREF curves, the polymer desirably is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable random interpolymer.

In another aspect, the inventive polymer is an olefin interpolymer, preferably comprising ethylene and one or more copolymerizable comonomers in polymerized form, characterized by a number of blocks (i.e., at least two blocks) or segments of two or more polymerized monomer units differing in chemical or physical properties (blocked interpolymer), said block interpolymer having a peak (but not just a molecular fraction) which elutes between 0° C. and 130° C. (but without collecting and/or isolating individual fractions), characterized in that said peak, has a comonomer content estimated by infra-red spectroscopy when expanded using a full width/half maximum (FWHM) area calculation, has an average molar comonomer content higher, preferably at least 5 percent higher, more preferably at least 10 percent higher, than that of a comparable random ethylene interpolymer peak at the same elution temperature and expanded using a full width/half maximum (FWHM) area calculation, wherein said comparable random ethylene interpolymer has the same comonomer(s) and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer. The full width/half maximum (FWHM) calculation is based on the ratio of methyl to methylene response area [CH$_3$/CH$_2$] from the ATREF infra-red detector, wherein the tallest (highest) peak is identified from the base line, and then the FWHM area is determined. For a distribution measured using an ATREF peak, the FWHM area is defined as the area under the curve between T$_1$ and T$_2$, where T$_1$ and T$_2$ are points determined, to the left and right of the ATREF peak, by dividing the peak height by two, and then drawing a line horizontal to the base line, that intersects the left and right portions of the ATREF curve. A calibration curve for comonomer content is made using random ethylene/α-olefin copolymers, plotting comonomer content from NMR versus FWHM area ratio of the TREF peak. For this infra-red method, the calibration curve is generated for the same comonomer type of interest. The comonomer content of TREF peak of the inventive polymer can be determined by referencing this calibration curve using its FWHM methyl:methylene area ratio [$CH_3/CH_2$] of the TREF peak.

ATREF Peak Comonomer Composition Measurement by Infra-Red Detector

The comonomer composition of the TREF peak can be measured using an IR4 infra-red detector available from Polymer Char, Valencia, Spain (http://www.polymerchar.com/).

The "composition mode" of the detector is equipped with a measurement sensor ($CH_2$) and composition sensor ($CH_3$) that are fixed narrow band infra-red filters in the region of 2800-3000 $cm^{-1}$. The measurement sensor detects the methylene ($CH_2$) carbons on the polymer (which directly relates to the polymer concentration in solution) while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known ethylene alpha-olefin copolymer standards.

The detector when used with an ATREF instrument provides both a concentration ($CH_2$) and composition ($CH_3$) signal response of the eluted polymer during the TREF process. A polymer specific calibration can be created by measuring the area ratio of the $CH_3$ to $CH_2$ for polymers with known comonomer content (preferably measured by NMR). The comonomer content of an ATREF peak of a polymer can be estimated by applying the reference calibration of the ratio of the areas for the individual $CH_3$ and $CH_2$ response (i.e. area ratio $CH_3/CH_2$ versus comonomer content).

The area of the peaks can be calculated using a full width/half maximum (FWHM) calculation after applying the appropriate baselines to integrate the individual signal responses from the TREF chromatogram. The full width/half maximum calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between T1 and T2, where T1 and T2 are points determined, to the left and right of the ATREF peak, by dividing the peak height by two, and then drawing a line horizontal to the base line, that intersects the left and right portions of the ATREF curve.

The application of infra-red spectroscopy to measure the comonomer content of polymers in this ATREF-infra-red method is, in principle, similar to that of GPC/FTIR systems as described in the following references: Markovich, Ronald P.; Hazlitt, Lonnie G.; Smith, Linley; "Development of gel-permeation chromatography-Fourier transform infrared spectroscopy for characterization of ethylene-based polyolefin copolymers". Polymeric Materials Science and Engineering (1991), 65, 98-100.; and Deslauriers, P. J.; Rohlfing, D. C.; Shieh, E. T.; "Quantifying short chain branching microstructures in ethylene-1-olefin copolymers using size exclusion chromatography and Fourier transform infrared spectroscopy (SEC-FTIR)", Polymer (2002), 43, 59-170., both of which are incorporated by reference herein in their entirety.

In other embodiments, the inventive ethylene/α-olefin interpolymer is characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF from 20° C. and 110° C., with an increment of 5° C.:

$$ABI = \Sigma(w_i BI_i)$$

where $BI_i$ is the block index for the $i^{th}$ fraction of the inventive ethylene/α-olefin interpolymer obtained in preparative TREF, and $w_i$ is the weight percentage of the $i^{th}$ fraction.

For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{LnP_X - LnP_{XO}}{LnP_A - LnP_{AB}}$$

where $T_X$ is the preparative ATREF elution temperature for the $i^{th}$ fraction (preferably expressed in Kelvin), $P_X$ is the ethylene mole fraction for the $i^{th}$ fraction, which can be measured by NMR or IR as described above. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As a first order approximation, the $T_A$ and $P_A$ values are set to those for high density polyethylene homopolymer, if the actual values for the "hard segments" are not available. For calculations performed herein, $T_A$ is 372° K, $P_A$ is 1.

$T_{AB}$ is the ATREF temperature for a random copolymer of the same composition and having an ethylene mole fraction of $P_{AB}$. $T_{AB}$ can be calculated from the following equation:

$$Ln P_{AB} = \alpha/T_{AB} + \beta$$

where α and β are two constants which can be determined by calibration using a number of known random ethylene copolymers. It should be noted that α and β may vary from instrument to instrument. Moreover, one would need to create their own calibration curve with the polymer composition of interest and also in a similar molecular weight range as the fractions. There is a slight molecular weight effect. If the calibration curve is obtained from similar molecular weight ranges, such effect would be essentially negligible. In some embodiments, random ethylene copolymers satisfy the following relationship:

$$Ln P = -237.83/T_{ATREF} + 0.639$$

$T_{XO}$ is the ATREF temperature for a random copolymer of the same composition and having an ethylene mole fraction of $P_X$. $T_{XO}$ can be calculated from $LnP_X = \alpha/T_{XO} + \beta$. Conversely, $P_{XO}$ is the ethylene mole fraction for a random copolymer of the same composition and having an ATREF temperature of $T_X$, which can be calculated from $Ln P_{XO} = \alpha/T_X + \beta$.

Once the block index (BI) for each preparative TREF fraction is obtained, the weight average block index, ABI, for the whole polymer can be calculated. In some embodiments, ABI is greater than zero but less than about 0.3 or from about 0.1 to about 0.3. In other embodiments, ABI is greater than about 0.3 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the inventive ethylene/α-olefin interpolymer is that the inventive ethylene/α-olefin interpolymer comprises at least one polymer fraction which can be obtained by preparative TREF, wherein the fraction has a block index greater than about 0.1 and up to about 1.0 and a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

For copolymers of ethylene and an α-olefin, the inventive polymers preferably possess (1) a PDI of at least 1.3, more preferably at least 1.5, at least 1.7, or at least 2.0, and most preferably at least 2.6, up to a maximum value of 5.0, more preferably up to a maximum of 3.5, and especially up to a maximum of 2.7; (2) a heat of fusion of 80 J/g or less; (3) an ethylene content of at least 50 weight percent; (4) a glass transition temperature, $T_g$, of less than −25° C., more preferably less than −30° C., and/or (5) one and only one $T_m$.

Additionally, the ethylene/α-olefin interpolymers can have a melt index, $I_2$, from 0.01 to 2000 g/10 minutes, preferably from 0.01 to 1000 g/10 minutes, more preferably from 0.01 to 500 g/10 minutes, and especially from 0.01 to 100 g/10 minutes. In certain embodiments, the ethylene/α-olefin interpolymers have a melt index, $I_2$, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the ethylene/α-olefin polymers is 1 g/10 minutes, 3 g/10 minutes or 5 g/10 minutes.

The polymers can have molecular weights, $M_w$, from 1,000 g/mole to 5,000,000 g/mole, preferably from 1000 g/mole to 1,000,000, more preferably from 10,000 g/mole to 500,000 g/mole, and especially from 10,000 g/mole to 300,000 g/mole. The density of the inventive polymers can be from 0.80 to 0.99 g/cm³ and preferably for ethylene containing polymers from 0.85 g/cm³ to 0.97 g/cm³. In certain embodiments, the density of the ethylene/α-olefin polymers ranges from 0.860 to 0.925 g/cm³ or 0.867 to 0.910 g/cm³.

In some embodiments, the ethylene/α-olefin interpolymers additionally have a Tm in the range of from −25° C. to 100° C., preferably from 30° C. to 80° C., and more preferably from 35° C. to 75° C. In some embodiments, they may also have a Tm in the range of from 15° C. to 50° C., from 30° C. to 45° C. or from 35° C. to 40° C. In some embodiments, the interpolymers have a Tm that is less than that of a comparable random copolymer with same weight percent comonomer within 10%. In addition, in some embodiments the end of melting occurs at less than 100° C., preferably in the range of from 85° C. to 95° C.

The ethylene/α-olefin interpolymers may also comprise additives and adjuvants. Suitable additives include, but are not limited to, fillers, such as organic or inorganic particles, including clays, talc, titanium dioxide, zeolites, powdered metals, organic or inorganic fibers, nano-sized particles, clays, and so forth; tackifiers, oil extenders, including paraffinic or napthelenic oils; and other natural and synthetic polymers, including other polymers according to embodiments of the invention. Additionally, minor amounts of a different polymer may be used as a carrier for any of the additives. An example of such a polymer would be polyethylene, for example AFFINITY® resins (The Dow Chemical Company) or EXACT® resins (ExxonMobil Chemical Company.

Representative catalysts and chain shuttling agent are as follows.

Catalyst (A1) is [N-(2,6-di(1-methylethyl)phenyl)amido) (2-isopropylphenyl)(α-naphthalen-2-diyl(6-pyridin-2-diyl) methane)]hafnium dimethyl, prepared according to the teachings of WO 03/40195, 2003US0204017, U.S. Ser. No. 10/429,024, filed May 2, 2003, and WO 04/24740.

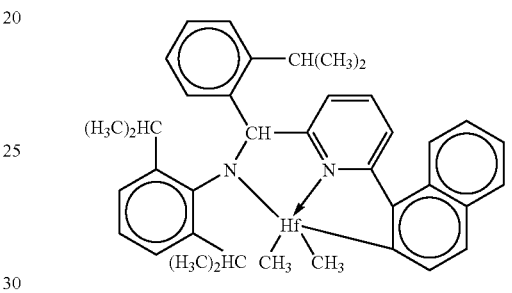

Catalyst (A2) is [N-(2,6-di(1-methylethyl)phenyl)amido) (2-methylphenyl)(1,2-phenylene-(6-pyridin-2-diyl)methane)]hafnium dimethyl, prepared according to the teachings of WO 03/40195, 2003US0204017, U.S. Ser. No. 10/429, 024, filed May 2, 2003, and WO 04/24740.

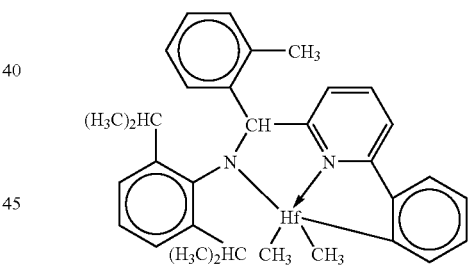

Catalyst (A3) is bis[N,N'''-(2,4,6-tri(methylphenyl)amido) ethylenediamine]hafnium dibenzyl.

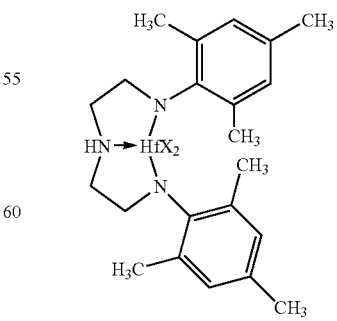

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of US-A-2004/0010103.

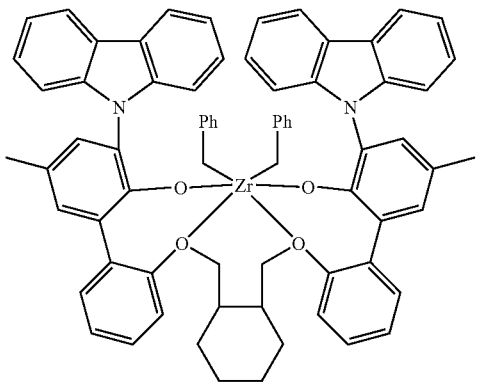

Catalyst (A5) is [η²-2,6-diisopropyl-N-(2-methyl-3-(octylimino)butan-2-yl)benzenamide]trimethylhafnium, prepared substantially according to the teachings of WO2003/051935, which is herein incorporated by reference.

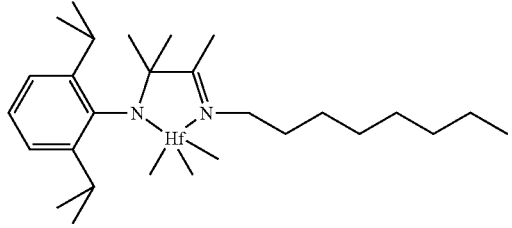

Catalyst (B1) is 1,2-bis-(3,5-di-t-butylphenylene)(1-(N-(1-methylethyl)immino)methyl)(2-oxoyl) zirconium dibenzyl

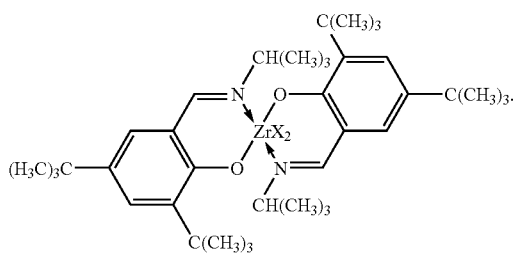

X = CH₂C₆H₅

Catalyst (B2) is 1,2-bis-(3,5-di-t-butylphenylene)(1-(N-(2-methylcyclohexyl)-immino)methyl)(2-oxoyl) zirconium dibenzyl

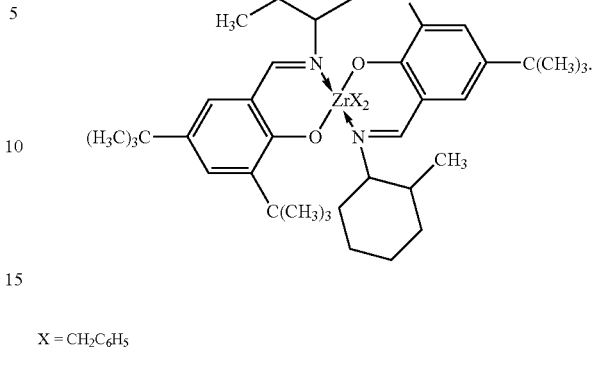

X = CH₂C₆H₅

Catalyst (C1) is (t-butylamido)dimethyl(3-N-pyrrolyl-1,2,3,3a,7a-η-inden-1-yl)silanetitanium dimethyl prepared substantially according to the techniques of U.S. Pat. No. 6,268,444:

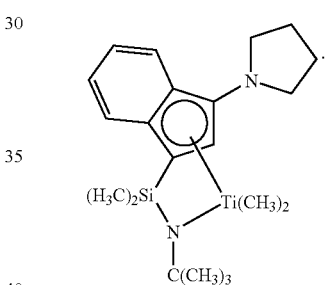

Catalyst (C2) is (t-butylamido)di(4-methylphenyl)(2-methyl-1,2,3,3a,7a-η-inden-1-yl)silanetitanium dimethyl prepared substantially according to the teachings of US-A-2003/004286:

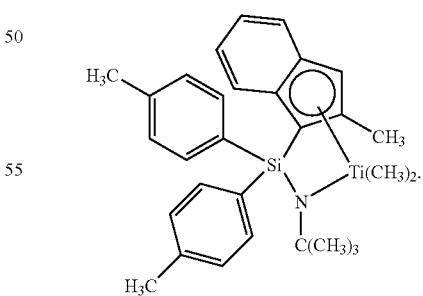

Catalyst (C3) is (t-butylamido)di(4-methylphenyl)(2-methyl-1,2,3,3a,8a-η-s-indacen-1-yl)silanetitanium dimethyl prepared substantially according to the teachings of US-A-2003/004286:

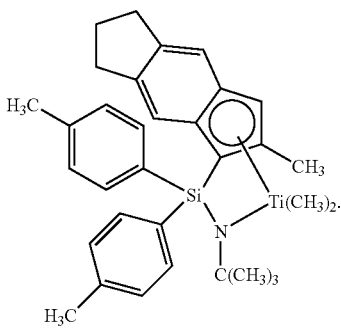

Catalyst (D1) is bis(dimethyldisiloxane)(indene-1-yl)zirconium dichloride available from Sigma-Aldrich:

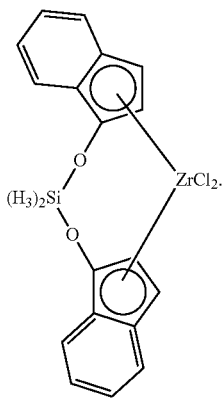

Shuttling Agents The shuttling agents employable include diethylzinc, di(i-butyl)zinc, di(n-hexyl)zinc, triethylaluminum, trioctylaluminum, triethylgallium, i-butylaluminum bis(dimethyl(t-butyl)siloxane), i-butylaluminum bis(di(trimethylsilyl)amide), n-octylaluminum di(pyridine-2-methoxide), bis(n-octadecyl)i-butylaluminum, butylaluminum bis(di(n-pentyl)amide), n-octylaluminum bis(2,6-di-t-butylphenoxide), n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide).

The inventive interpolymers may comprise alternating blocks of differing comonomer content (including homopolymer blocks). The inventive interpolymers may also comprise a distribution in block size of polymer blocks of differing density or comonomer content, which is a Schultz-Flory type of distribution.

The ethylene/α-olefin interpolymers used in the embodiments of the invention are preferably interpolymers of ethylene with at least one $C_3$-$C_{20}$ α-olefin. Copolymers of ethylene and a $C_3$-$C_{20}$ α-olefin are especially preferred. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. Propylene and non-conjugated dienes are preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While ethylene/α-olefin interpolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_3$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers comprising monovinylidene aromatic monomers including styrene, o-methyl styrene, p-methyl styrene, t-butylstyrene, and the like. In particular, interpolymers comprising ethylene and styrene can be prepared by following the teachings herein. Optionally, copolymers comprising ethylene, styrene and a $C_3$-$C_{20}$ alpha olefin, optionally comprising a $C_4$-$C_{20}$ diene, having improved properties can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multiring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4- hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable polymers that can be made in accordance with embodiments of the invention are elastomeric interpolymers of ethylene, a $C_3$-$C_{20}$ α-olefin, especially propylene, and optionally one or more diene monomers. Preferred α-olefins for use in this embodiment of the present invention are designated by the formula $CH_2$=CHR*, where R* is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Because the diene containing polymers comprise alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

In some embodiments, the inventive interpolymers made with two catalysts incorporating differing quantities of comonomer have a weight ratio of blocks formed thereby from 95:5 to 5:95. The polymers desirably have an ethylene content of from 20 to 90 percent, a diene content of from 0.1 to 10 percent, and an α-olefin content of from 10 to 80 percent, based on the total weight of the polymer. Further preferably, the pseudo-block polymers have an ethylene content of from 60 to 90 percent, a diene content of from 0.1 to 10 percent, and an α-olefin content of from 10 to 40 percent, based on the total weight of the polymer. Preferred polymers are high molecular weight polymers, having a weight average molecular weight (Mw) from 10,000 to about 2,500,000, preferably from 20,000 to 500,000, more preferably from 20,000 to 350,000, and a polydispersity less than 3.5, more preferably less than 3.0, and a Mooney viscosity (ML (1+4) 125° C.) from 1 to 250. More preferably, such polymers have an ethylene content from 65 to 75 percent, a diene content from 0 to 6 percent, and an α-olefin content from 20 to 35 percent.

The ethylene/α-olefin interpolymers can be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an ethylene/α-olefin interpolymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of these patents are incorporated herein by reference in their entirety. One particularly useful functional group is malic anhydride.

The amount of the functional group present in the functional interpolymer can vary. The functional group can typically be present in a copolymer-type functionalized interpolymer in an amount of at least about 1.0 weight percent, preferably at least about 5 weight percent, and more preferably at least about 7 weight percent. The functional group will typically be present in a copolymer-type functionalized interpolymer in an amount less than about 40 weight percent, preferably less than about 30 weight percent, and more preferably less than about 25 weight percent.

The amount of the ethylene/α-olefin interpolymer in the lubricant composition disclosed herein can vary from about 0.01 to about 30 wt %, from about 0.05 to about 20 wt %, from about 0.1 to about 15 wt %, from about 0.5 to about 10 wt %, or from about 1 to about 5 wt %, based on the total amount of the lubricant composition.

Base Oils

Any base oil known to a person of ordinary skill in the art can be used for preparing the lubricant compositions. The base oils suitable for preparing lubricant compositions have been described in Mortier et al., "*Chemistry and Technology of Lubricants*," 2nd Edition, London, Springer, Chapters 1 and 2 (1996), incorporated herein by reference. Generally, the lubricant composition may comprise from about 70 to 99 wt % of the base oil, based on the total weight of the lubricant composition. In some embodiments, the lubricant composition comprises from about 80 to 98 wt % of the base oil, based on the total weight of the lubricant composition.

In some embodiments, the base oil comprises any of the base stocks in Groups I-V as specified in the American Petroleum Institute (API) Publication 1509, Fourteenth Edition, December 1996 (i.e., API Base Oil Interchangeability Guidelines for Passenger Car Motor Oils and Diesel Engine Oils), which is incorporated herein by reference. The API guideline defines a base stock as a lubricant component that may be manufactured using a variety of different processes. Groups I, II and III base stocks are mineral oils, each with specific ranges of the amount of saturates, sulfur content and viscosity index. Group IV base stocks are polyalphaolefins (PAO). Group V base stocks include all other base stocks not included in Group I, II, III, or IV. In particular embodiments, the base oil comprises a combination of the base stocks in Groups I-V.

In other embodiments, the base oil comprises a natural oil, a synthetic oil or a combination thereof. Non-limiting examples of suitable natural oils include animal oils (e.g., lard oil), vegetable oils, (e.g., corn oil, castor oil, and peanut oil), oils derived from coal or shale, mineral oils (e.g., liquid petroleum oils and solvent treated or acid-treated mineral oils of the paraffinic, naphthenic or mixed paraffinic-naphthenic types) and combinations thereof. Non-limiting examples of suitable synthetic lubricating oils include poly-alpha-olefins, alkylated aromatics, polybutenes, aliphatic diesters, polyol esters, polyalkylene glycols, phosphate esters and combinations thereof.

In further embodiments, the base oil comprises hydrocarbon oils such as polyolefins (e.g., polybutylenes, polypropylenes, propylene isobutylene copolymers, polyhexene, polyoctene, polydecene, and the like); alkylbenzenes (e.g., dodecylbenzenes, tetradecylbenzenes, dinonylbenzenes, di-(2-ethylhexyl)benzenes, and the like); polyphenyls (e.g., biphenyls, terphenyls, alkylated polyphenyls, and the like);

alkylated diphenyl ethers; alkylated diphenyl sulfides; and the derivatives, isomers, analogs, homologs and combinations thereof.

In further embodiments, the base oil comprises a poly-alpha-olefin (PAO). In general, the poly-alpha-olefins may be derived from an alpha-olefin having from about 2 to about 30, or from about 4 to about 20, or from about 6 to about 16 carbon atoms. Non-limiting examples of suitable poly-alpha-olefins include those derived from octene, decene, mixtures thereof, and the like. These poly-alpha-olefins may have a viscosity from about 2 to about 15, or from about 3 to about 12, or from about 4 to about 8 centistokes at 100° C. In some instances, the poly-alpha-olefins may be used together with other base oils such as mineral oils.

In further embodiments, the base oil comprises a polyalkylene glycol or a polyalkylene glycol derivative, wherein the terminal hydroxyl groups of the polyalkylene glycol may be modified by esterification, etherification, acetylation and the like. Non-limiting examples of suitable polyalkylene glycols include polyethylene glycol, polypropylene glycol, polyisopropylene glycol, and combinations thereof. Non-limiting examples of suitable polyalkylene glycol derivatives include ethers of polyalkylene glycols (e.g., methyl ether of polyisopropylene glycol, diphenyl ether of polyethylene glycol, diethyl ether of polypropylene glycol, etc.), mono- and poly-carboxylic esters of polyalkylene glycols, and combinations thereof. In some instances, the polyalkylene glycol or polyalkylene glycol derivative may be used together with other base oils such as poly-alpha-olefins and mineral oils.

In further embodiments, the base oil comprises any of the esters of dicarboxylic acids (e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, alkenyl malonic acids, and the like) with a variety of alcohols (e.g., butyl alcohol, hexyl alcohol, dodecyl alcohol, 2-ethylhexyl alcohol, ethylene glycol, diethylene glycol monoether, propylene glycol, and the like). Non-limiting examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the like.

In further embodiments, the base oil comprises a hydrocarbon prepared by the Fischer-Tropsch process. The Fischer-Tropsch process prepares hydrocarbons from gases containing hydrogen and carbon monoxide using a Fischer-Tropsch catalyst. These hydrocarbons may require further processing in order to be useful as base oils. For example, the hydrocarbons may be dewaxed, hydroisomerized, and/or hydrocracked using processes known to a person of ordinary skill in the art.

In further embodiments, the base oil comprises a refined, unrefined, or rerefined oil. Unrefined oils are those obtained directly from a natural or synthetic source without further purification treatment. Non-limiting examples of unrefined oils include shale oils obtained directly from retorting operations, petroleum oils obtained directly from primary distillation, and ester oils obtained directly from an esterification process and used without further treatment. Refined oils are similar to the unrefined oils except the former have been further treated by one or more purification processes to improve one or more properties. Many such purification processes are known to those skilled in the art such as solvent extraction, secondary distillation, acid or base extraction, filtration, percolation, and the like. Rerefined oils are obtained by applying to refined oils processes similar to those used to obtain refined oils. Such rerefined oils are also known as reclaimed or reprocessed oils and often are additionally treated by processes directed to removal of spent additives and oil breakdown products.

Additives

Optionally, the lubricant composition may further comprise at least an additive or a modifier (hereinafter designated as "additive") that can impart or improve any desirable property of the lubricant composition. Any additive known to a person of ordinary skill in the art may be used in the lubricant compositions disclosed herein. Some suitable additives have been described in Mother et al., "*Chemistry and Technology of Lubricants*," 2nd Edition, London, Springer, (1996); and Leslie R. Rudnick, "*Lubricant Additives: Chemistry and Applications*," New York, Marcel Dekker (2003), both of which are incorporated herein by reference. In some embodiments, the additive can be selected from the group consisting of detergents, dispersants, friction modifiers, pour point depressants, demulsifiers, anti-foams, corrosion inhibitors, anti-wear agents, antioxidants, rust inhibitors, and combinations thereof. In general, the concentration of each of the additives in the lubricant composition, when used, can range from about 0.001 to about 20 wt %, from about 0.01 to about 10 wt % or from about 0.1 to about 5 wt %, based on the total weight of the lubricant composition.

The lubricant composition disclosed herein may comprise a detergent that can control varnish, ring zone deposits, and rust by keeping insoluble particles in colloidal suspension and in some cases, by neutralizing acids. Any detergent known by a person of ordinary skill in the art may be used in the lubricant composition. Non-limiting examples of suitable detergents include metal sulfonates, phenates, salicylates, phosphonates, thiophosphonates and combinations thereof. The metal can be any metal suitable for making sulfonate, phenate, salicylate or phosphonate detergents. Non-limiting examples of suitable metals include alkali metals, alkaline metals and transition metals. In some embodiments, the metal is Ca, Mg, Ba, K, Na, Li or the like. The amount of the detergent may vary from about 0.01 to about 10 wt %, from about 0.05 to about 5 wt %, or from about 0.1 to about 3 wt %, based on the total weight of the lubricant composition. Some suitable detergents have been described in Mortier et al., "*Chemistry and Technology of Lubricants*," 2nd Edition, London, Springer, Chapter 3, pages 75-85 (1996); and Leslie R. Rudnick, "*Lubricant Additives: Chemistry and Applications*," New York, Marcel Dekker, Chapter 4, pages 113-136 (2003), both of which are incorporated herein by reference.

The lubricant composition disclosed herein may comprise a dispersant that can prevent sludge, varnish, and other deposits by keeping particles suspended in a colloidal state. Any dispersant known by a person of ordinary skill in the art may be used in the lubricant composition. Non-limiting examples of suitable dispersants include succinimides, succiamides, benzylamines, succinate esters, succinate ester-amides, Mannich type dispersants, phosphorus-containing dispersants, boron-containing dispersants and combinations thereof. The amount of the dispersant may vary from about 0.01 to about 10 wt %, from about 0.05 to about 7 wt %, or from about 0.1 to about 4 wt %, based on the total weight of the lubricant composition. Some suitable dispersants have been described in Mortier et al., "*Chemistry and Technology of Lubricants*," 2nd Edition, London, Springer, Chapter 3, pages 86-90 (1996); and Leslie R. Rudnick, "*Lubricant Additives: Chemistry and Applications*," New York, Marcel Dekker, Chapter 5, pages 137-170 (2003), both of which are incorporated herein by reference.

The lubricant composition disclosed herein may comprise a friction modifier that can lower the friction between moving parts. Any friction modifier known by a person of ordinary skill in the art may be used in the lubricant composition. Non-limiting examples of suitable friction modifiers include fatty carboxylic acids; derivatives (e.g., esters, amides, metal salts and the like) of fatty carboxylic acids; mono-, di- or tri-alkyl substituted phosphoric acids or phosphonic acids; derivatives (e.g., esters, amides, metal salts and the like) of mono-, di- or tri-alkyl substituted phosphoric acids or phosphonic acids; mono-, di- or tri-alkyl substituted amines; mono- or di-alkyl substituted amides and combinations thereof. In some embodiments, the friction modifier is selected from the group consisting of aliphatic amines, ethoxylated aliphatic amines, aliphatic carboxylic acid amides, ethoxylated aliphatic ether amines, aliphatic carboxylic acids, glycerol esters, aliphatic carboxylic ester-amides, fatty imidazolines, fatty tertiary amines, wherein the aliphatic or fatty group contains more than about eight carbon atoms so as to render the compound suitably oil soluble. In other embodiments, the friction modifier comprises an aliphatic substituted succinimide formed by reacting an aliphatic succinic acid or anhydride with ammonia or a primary amine. The amount of the friction modifier may vary from about 0.01 to about 10 wt %, from about 0.05 to about 5 wt %, or from about 0.1 to about 3 wt %, based on the total weight of the lubricant composition. Some suitable friction modifiers have been described in Mortier et al., "*Chemistry and Technology of Lubricants*," 2nd Edition, London, Springer, Chapter 6, pages 183-187 (1996); and Leslie R. Rudnick, "*Lubricant Additives: Chemistry and Applications*," New York, Marcel Dekker, Chapters 6 and 7, pages 171-222 (2003), both of which are incorporated herein by reference.

The lubricant composition disclosed herein may comprise a pour point depressant that can lower the pour point of the lubricant composition. Any pour point depressant known by a person of ordinary skill in the art may be used in the lubricant composition. Non-limiting examples of suitable pour point depressants include polymethacrylates, polyacrylates, di(tetra-paraffin phenol)phthalate, condensates of tetra-paraffin phenol, condensates of a chlorinated paraffin with naphthalene and combinations thereof. In some embodiments, the pour point depressant comprises an ethylene-vinyl acetate copolymer, a condensate of chlorinated paraffin and phenol, polyalkyl styrene or the like. The amount of the pour point depressant may vary from about 0.01 to about 10 wt %, from about 0.05 to about 5 wt %, or from about 0.1 to about 3 wt %, based on the total weight of the lubricant composition. Some suitable pour point depressants have been described in Mortier et al., "*Chemistry and Technology of Lubricants*," 2nd Edition, London, Springer, Chapter 6, pages 187-189 (1996); and Leslie R. Rudnick, "*Lubricant Additives: Chemistry and Applications*," New York, Marcel Dekker, Chapter 11, pages 329-354 (2003), both of which are incorporated herein by reference.

The lubricant composition disclosed herein may comprise a demulsifier that can promote oil-water separation in lubricant compositions that are exposed to water or steam. Any demulsifier known by a person of ordinary skill in the art may be used in the lubricant composition. Non-limiting examples of suitable demulsifiers include anionic surfactants (e.g., alkyl-naphthalene sulfonates, alkyl benzene sulfonates and the like), nonionic alkoxylated alkylphenol resins, polymers of alkylene oxides (e.g., polyethylene oxide, polypropylene oxide, block copolymers of ethylene oxide, propylene oxide and the like), esters of oil soluble acids and combinations thereof. The amount of the demulsifier may vary from about 0.01 to about 10 wt %, from about 0.05 to about 5 wt %, or from about 0.1 to about 3 wt %, based on the total weight of the lubricant composition. Some suitable demulsifiers have been described in Mortier et al., "*Chemistry and Technology of Lubricants*," 2nd Edition, London, Springer, Chapter 6, pages 190-193 (1996), which is incorporated herein by reference.

The lubricant composition disclosed herein may comprise an anti-foam that can break up foams in oils. Any anti-foam known by a person of ordinary skill in the art may be used in the lubricant composition. Non-limiting examples of suitable anti-foams include silicone oils or polydimethylsiloxanes, fluorosilicones, alkoxylated aliphatic acids, polyethers (e.g., polyethylene glycols), branched polyvinyl ethers, polyacrylates, polyalkoxyamines and combinations thereof. In some embodiments, the anti-foam comprises glycerol monostearate, polyglycol palmitate, a trialkyl monothiophosphate, an ester of sulfonated ricinoleic acid, benzoylacetone, methyl salicylate, glycerol monooleate, or glycerol dioleate. The amount of the anti-foam may vary from about 0.01 to about 5 wt %, from about 0.05 to about 3 wt %, or from about 0.1 to about 1 wt %, based on the total weight of the lubricant composition. Some suitable anti-foams have been described in Mortier et al., "*Chemistry and Technology of Lubricants*," 2nd Edition, London, Springer, Chapter 6, pages 190-193 (1996), which is incorporated herein by reference.

The lubricant composition disclosed herein may comprise a corrosion inhibitor that can reduce corrosion. Any corrosion inhibitor known by a person of ordinary skill in the art may be used in the lubricant composition. Non-limiting examples of suitable corrosion inhibitor include half esters or amides of dodecylsuccinic acid, phosphate esters, thiophosphates, alkyl imidazolines, sarcosines and combinations thereof. The amount of the corrosion inhibitor may vary from about 0.01 to about 5 wt %, from about 0.05 to about 3 wt %, or from about 0.1 to about 1 wt %, based on the total weight of the lubricant composition. Some suitable corrosion inhibitors have been described in Mortier et al., "*Chemistry and Technology of Lubricants*," 2nd Edition, London, Springer, Chapter 6, pages 193-196 (1996), which is incorporated herein by reference.

The lubricant composition disclosed herein may comprise an anti-wear agent that can reduce friction and excessive wear. Any anti-wear agent known by a person of ordinary skill in the art may be used in the lubricant composition. Non-limiting examples of suitable anti-wear agents include zinc dithiophosphate, metal (e.g., Pb, Sb, Mo and the like) salts of dithiophosphate, metal (e.g., Zn, Pb, Sb, Mo and the like) salts of dithiocarbamate, metal (e.g., Zn, Pb, Sb and the like) salts of fatty acids, boron compounds, phosphate esters, phosphite esters, amine salts of phosphoric acid esters or thiophosphoric acid esters, reaction products of dicyclopentadiene and thiophosphoric acids and combinations thereof. The amount of the anti-wear agent may vary from about 0.01 to about 5 wt %, from about 0.05 to about 3 wt %, or from about 0.1 to about 1 wt %, based on the total weight of the lubricant composition. Some suitable anti-wear agents have been described in Leslie R. Rudnick, "*Lubricant Additives: Chemistry and Applications*," New York, Marcel Dekker, Chapter 8, pages 223-258 (2003), which is incorporated herein by reference.

The lubricant composition disclosed herein may comprise an extreme pressure (EP) agent that can prevent sliding metal surfaces from seizing under conditions of extreme pressure. Any extreme pressure agent known by a person of ordinary skill in the art may be used in the lubricant composition. Generally, the extreme pressure agent is a compound that can combine chemically with a metal to form a surface film that prevents the welding of asperities in opposing metal surfaces under high loads. Non-limiting examples of suitable extreme pressure agents include sulfurized animal or vegetable fats or oils, sulfurized animal or vegetable fatty acid esters, fully or partially esterified esters of trivalent or pentavalent acids of phosphorus, sulfurized olefins, dihydrocarbyl polysulfides, sulfurized Diels-Alder adducts, sulfurized dicyclopentadiene, sulfurized or co-sulfurized mixtures of fatty acid esters and monounsaturated olefins, co-sulfurized blends of fatty acid, fatty acid ester and alpha-olefin, functionally-substituted dihydrocarbyl polysulfides, thia-aldehydes, thia-ketones, epithio compounds, sulfur-containing acetal derivatives, co-sulfurized blends of terpene and acyclic olefins, and polysulfide olefin products, amine salts of phosphoric acid esters or thiophosphoric acid esters and combinations thereof. The amount of the extreme pressure agent may vary from about 0.01 to about 5 wt %, from about 0.05 to about 3 wt %, or from about 0.1 to about 1 wt %, based on the total weight of the lubricant composition. Some suitable extreme pressure agents have been described in Leslie R. Rudnick, "*Lubricant Additives: Chemistry and Applications*," New York, Marcel Dekker, Chapter 8, pages 223-258 (2003), which is incorporated herein by reference.

The lubricant composition disclosed herein may comprise an antioxidant that can reduce or prevent the oxidation of the base oil. Any antioxidant known by a person of ordinary skill in the art may be used in the lubricant composition. Non-limiting examples of suitable antioxidants include amine-based antioxidants (e.g., alkyl diphenylamines, phenyl-$\alpha$-naphthylamine, alkyl or aralkyl substituted phenyl-$\alpha$-naphthylamine, alkylated p-phenylene diamines, tetramethyl-diaminodiphenylamine and the like), phenolic antioxidants (e.g., 2-tert-butylphenol, 4-methyl-2,6-di-tert-butylphenol, 2,4,6-tri-tert-butylphenol, 2,6-di-tert-butyl-p-cresol, 2,6-di-tert-butylphenol, 4,4'-methylenebis-(2,6-di-tert-butylphenol), 4,41-thiobis(6-di-tert-butyl-o-cresol) and the like), sulfur-based antioxidants (e.g., dilauryl-3,3'-thiodipropionate, sulfurized phenolic antioxidants and the like), phosphorous-based antioxidants (e.g., phosphites and the like), zinc dithiophosphate, oil-soluble copper compounds and combinations thereof. The amount of the antioxidant may vary from about 0.01 to about 10 wt %, from about 0.05 to about 5%, or from about 0.1 to about 3%, based on the total weight of the lubricant composition. Some suitable antioxidants have been described in Leslie R. Rudnick, "*Lubricant Additives: Chemistry and Applications*," New York, Marcel Dekker, Chapter 1, pages 1-28 (2003), which is incorporated herein by reference.

The lubricant composition disclosed herein may comprise a rust inhibitor that can inhibit the corrosion of ferrous metal surfaces. Any rust inhibitor known by a person of ordinary skill in the art may be used in the lubricant composition. Non-limiting examples of suitable rust inhibitors include oil-soluble monocarboxylic acids (e.g., 2-ethylhexanoic acid, lauric acid, myristic acid, palmitic acid, oleic acid, linoleic acid, linolenic acid, behenic acid, cerotic acid and the like), oil-soluble polycarboxylic acids (e.g., those produced from tall oil fatty acids, oleic acid, linoleic acid and the like), alkenylsuccinic acids in which the alkenyl group contains 10 or more carbon atoms (e.g., tetrapropenylsuccinic acid, tetradecenylsuccinic acid, hexadecenylsuccinic acid, and the like); long-chain alpha,omega-dicarboxylic acids having a molecular weight in the range of 600 to 3000 daltons and combinations thereof. The amount of the rust inhibitor may vary from about 0.01 to about 10 wt %, from about 0.05 to about 5%, or from about 0.1 to about 3%, based on the total weight of the lubricant composition.

The additives may be in the form of an additive concentrate having more than one additive. The additive concentrate may comprise a suitable diluent, most preferably a hydrocarbon oil of suitable viscosity. Such diluent can be selected from the group consisting of natural oils (e.g., mineral oils), synthetic oils and combinations thereof. Non-limiting examples of the mineral oils include paraffin-based oils, naphthenic-based oils, asphaltic-based oils and combinations thereof. Non-limiting examples of the synthetic base oils include polyolefin oils (especially hydrogenated alpha-olefin oligomers), alkylated aromatic, polyalkylene oxides, aromatic ethers, and carboxylate esters (especially diester oils) and combinations thereof. In some embodiments, the diluent is a light hydrocarbon oil, both natural or synthetic. Generally, the diluent oil can have a viscosity in the range of 13 to 35 centistokes at 40° C.

The lubricant composition disclosed herein may be suitable for use as motor oils (or engine oils or crankcase oils), transmission fluids, gear oils, power steering fluids, shock absorber fluids, brake fluids, hydraulic fluids and/or greases.

In some embodiments, the lubricant composition disclosed herein is a motor oil. Such a motor oil composition may be used to lubricate all major moving parts in any reciprocating internal combustion engine, reciprocating compressors and in steam engines of crankcase design. In automotive applications, the motor oil composition may also be used to cool hot engine parts, keep the engine free of rust and deposits, and seal the rings and valves against leakage of combustion gases. The motor oil composition may comprise a base oil and the ethylene/$\alpha$-olefin interpolymer. The motor oil composition may further comprise at least an additive. In some embodiments, the motor oil composition further comprises a pour point depressant, a detergent, a dispersant, an anti-wear, an antioxidant, a friction modifier, a rust inhibitor, or a combination thereof.

In other embodiments, the lubricant composition disclosed herein is a gear oil for either automotive or industrial applications. The gear oil composition may be used to lubricate gears, rear axles, automotive transmissions, final drive axles, accessories in agricultural and construction equipment, gear housings and enclosed chain drives. The gear oil composition may comprise a base oil and the ethylene/$\alpha$-olefin interpolymer. The gear oil composition may further comprise at least an additive. In some embodiments, the gear oil composition further comprises an anti-wear, an extreme pressure agent, a rust inhibitor, or a combination thereof.

In further embodiments, the lubricant composition disclosed herein is a transmission fluid. The transmission fluid composition may be used in either automatic transmission or manual transmission to reduce transmission losses. The transmission fluid composition may comprise a base oil and the ethylene/$\alpha$-olefin interpolymer. The transmission fluid composition may further comprise at least an additive. In some embodiments, the transmission fluid composition further comprises a friction modifier, a detergent, a dispersant, an antioxidant, an anti-wear agent, an extreme pressure agent, a pour point depressant, an anti-foam, a corrosion inhibitor or a combination thereof.

In further embodiments, the lubricant composition disclosed herein is a grease used in various applications where extended lubrication is required and where oil would not be retained, e.g., on a vertical shaft. The grease composition may comprise a base oil, the ethylene/$\alpha$-olefin interpolymer and a thickener. In some embodiments, the grease composition further comprise a complexing agent, an antioxidant, an anti-wear agent, an extreme pressure agent, an anti-foam, a corrosion inhibitor or a mixture thereof. In some embodiments, the thickener is a soap formed by reacting a metal hydroxide (e.g., lithium hydroxide, sodium hydroxide, potassium hydroxide, calcium hydroxide, zinc hydroxide and the like) with a fat, a fatty acid, or an ester. In general, the type of soap used depends on the grease properties desired. In other embodiments, the thickener may be a non-soap thickener selected from the group consisting of clays, silica gels, carbon black, various synthetic organic materials and combinations thereof. In further embodiments, the thickener comprises a combination of soaps and non-soap thickeners.

Processes of Preparing Lubricant Compositions

The lubricant compositions disclosed herein can be prepared by any method known to a person of ordinary skill in the art for making lubricating oils. In some embodiments, the base oil can be blended or mixed with the ethylene/α-olefin interpolymer and optionally at least an additive. The ethylene/α-olefin interpolymer and the optional additives may be added to the base oil individually or simultaneously. In some embodiments, the ethylene/α-olefin interpolymer and the optional additives are added to the base oil individually in one or more additions and the additions may be in any order. In other embodiments, the ethylene/α-olefin interpolymer and the additives are added to the base oil simultaneously, optionally in the form of an additive concentrate. In some embodiments, the solubilizing of the ethylene/α-olefin interpolymer or any solid additives in the base oil may be assisted by heating the mixture to a temperature between about 25 and about 200° C., from about 50 and about 150° C. or from about 75 and about 125° C.

Any mixing or dispersing equipment known to a person of ordinary skill in the art may be used for blending, mixing or solubilizing the ingredients. The blending, mixing or solubilizing may be carried out with a blender, an agitator, a disperser, a mixer (e.g., Ross double planetary mixers and Collette planetary mixers), a homogenizer (e.g., Gaulin homogeneizers and Rannie homogeneizers), a mill (e.g., colloid mill, ball mill and sand mill) or any other mixing or dispersing equipment known in the art.

Embodiments of the invention provide lubricant compositions made from a base oil and the ethylene/α-olefin interpolymer. Preferably, the ethylene/α-olefin interpolymer is an ethylene/α-olefin interpolymer comprising two or more substantially homogeneous intramolecular segments or blocks comprising differing chemical or physical properties, said intramolecular segments characterized by possessing a most probable molecular weight distribution, wherein the ethylene/α-olefin interpolymer comprises a hard segment and a soft segment.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

Testing Methods

In the examples that follow, the following analytical techniques are employed:

GPC-IR Method

Gel Permeation Chromatography (GPC)

The gel permeation chromatographic system is either a Polymer Laboratories Model PL-210 or a Polymer Laboratories Model PL-220 instrument. The column and carousel compartments are operated at 150° C. Four Polymer Laboratories 20-micron Mixed-A columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 200 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym, Let.*, 6, 621 (1968)):

$$M_{polyethylene}=0.431(M_{polystyrene}).$$

Polyetheylene equivalent molecular weight calculations are performed using Viscotek TriSEC software Version 3.0.

Molecular Weight-Comonomer Composition Measurement by Infra-Red Detector

The comonomer composition throughout the GPC curve can be measured using an IR4 infra-red detector that is available from Polymer Char, Valencia, Spain (http://www.polymerchar.com/).

The "composition mode" of the detector is equipped with a measurement sensor ($CH_2$) and composition sensor ($CH_3$) that are fixed narrow band infra-red filters in the region of 2800-3000 $cm^{-1}$. The measurement sensor detects the methylene ($CH_2$) carbons on the polymer (which directly relates to the polymer concentration in solution) while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known ethylene alpha-olefin copolymer standards.

The detector when used with a GPC instrument provides both a concentration ($CH_2$) and composition ($CH_3$) signal response of the eluted polymer during the GPC process. A polymer specific calibration can be created by measuring the area ratio of the $CH_3$ to $CH_2$ for polymers with known comonomer content (preferably measured by NMR). The comonomer distribution of a polymer can be estimated by applying a reference calibration of the ratio of the areas for the individual $CH_3$ and $CH_2$ response (i.e. area ratio $CH_3/CH_2$ versus comonomer content).

By taking the ratio of the $CH_3/CH_2$ response at each elution volume, the response to the polymer's composition is measured. After applying the appropriate reference calibration, the composition response can be used to estimate the comonomer amount at each elution volume. Integration of the entire GPC profile provides the average comonomer content of the polymer while the slope of the line from the comonomer versus molecular weight provides an indication of the uniformity of the comonomer distribution. When integrating the GPC chromatograph for composition determination, the integration region should be set to be greater than 5 weight percent of the polymer on either end of the chromatogram.

The application of infra-red spectroscopy to measure the comonomer content of polymers in this system is similar in principle to GPC/FTIR systems as described in the following references:

Markovich, Ronald P.; Hazlitt, Lonnie G.; Smith, Linley; "Development of gel-permeation chromatography-Fourier transform infrared spectroscopy for characterization of ethylene-based polyolefin copolymers", *Polymeric Materials Science and Engineering* (1991), 65, 98-100.

Deslauriers, P. J.; Rohlfing, D. C.; Shieh, E. T.; "Quantifying short chain branching microstructures in ethylene-1-olefin copolymers using size exclusion chromatography and Fourier transform infrared spectroscopy (SEC-FTIR)", *Polymer* (2002), 43, 59-170.

DSC Standard Method

Differential Scanning Calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

Density

Samples for density measurement are prepared according to ASTM D 1928. Measurements are made within one hour of sample pressing using ASTM D792, Method B.

Melt Index

Melt index, or $I_2$, is measured in accordance with ASTM D 1238, Condition 190° C./2.16 kg. Melt index, or $I_{10}$ is also measured in accordance with ASTM D 1238, Condition 190° C./10 kg.

Mooney Viscosity

Mooney viscosity is measured in accordance with ASTM D1646-06 at 125° C., ML 1+4 (MU)).

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3 g of a 50/50 mixture of tetrachloroethane-$d_2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989)), which is incorporated by reference herein in its entirety.

Method for $^{13}$C NMR analysis

The following generally describes an NMR methodology to determine the composition, sequence distribution and ratio of amorphous and semi-crystalline blocks of an ethylene-propylene olefin block copolymer with ethylene/propylene segment/block compositions that differ by less than 25-30 wt % ethylene by using the relationship between NMR integrals and comonomer concentration.

For a diblock copolymer with both blocks made by a specific catalyst, the NMR integrals fit the following equation:

$$I=P*f(E1)+(1-P)*f(E2)$$

Where

I is the integral for a selected peak of copolymer
P is the weight fraction of the first block
E1 is the concentration of ethylene in first block
E2 is the concentration of ethylene in second block
f(E1) is the integral contribution from the first block
f(E2) is the integral contribution from the second block As there are more than 3 integrals and only three unknowns (P, E1 and E2), an optimized solution of P, E1 and E2 can be obtained from normalized NMR integrals.

In the second step, assign an initial value to E1 corresponding to the value expected from the process parameters and calculate corresponding integrals with equations.

In the third step, assign an initial value to E2 corresponding to the value expected from the process parameters and calculate corresponding integrals with equations.

In the fourth step, assign an initial value to P corresponding to the value expected from the process parameters and the equation, I=P*f(E1)+(1−P)*f(E2), is used to get simulated integrals.

Lastly, the calculated residual errors between raw normalized and simulated integrals are minimized to minimize the sum of the residual errors to get P, E1 and E2.

Polymer Fractionation by TREF

Large-scale TREF fractionation is carried by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm×12 cm) steel column packed with a 60:40 (v:v) mix of 30-40 mesh (600-425 µm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63 Industrial Drive, North Tonawanda, N.Y., 14120). The column is immersed in a thermally controlled oil jacket, set initially to 160° C. The column is first cooled ballistically to 125° C., then slow cooled to 20° C. at 0.04° C. per minute and held for one hour. Fresh TCB is introduced at about 65 ml/min while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 μm polytetrafluoroethylene coated filter paper (available from Osmonics Inc., Cat#Z50WP04750). The filtrated fractions are dried overnight in a vacuum oven at 60° C. and weighed on an analytical balance before further testing.

Turbidity

Turbidity of the oil or solvent solutions were measured using a HACH RATIO Turbidimeter Model 18900 using the 0-20 NTU resolution scale (+/−0.1 NTU).

Oil Measurements

Pour Point

Samples are poured into a cylindrical test jar of clear glass, specifications per ASTM D 97 to the marked level. The test jar is closed with a rubber cork bored centrally for the test thermometers. The test thermometers are adjusted so that they are coaxial with the jar and immersed so the beginning of the capillary is approximately 3 mm below the surface of the sample. Samples are then placed in a Form a Scientific Cloud and Pour Console. The starting temperature is set at 10° C. and adjusted down in 6° intervals until there is no movement in the sample when holding it in a horizontal position for 5 seconds. That reading is recorded and 3° C. is added for the final pour point result.

Thickening Efficiency

Thickening efficiency is measured according to ASTM D445, which is herein incorporated by reference. Thickening efficiency of a polymer is equal to the kinematic viscosity at 100° C. of a 1 wt % polymer solution in oil under zero shear.

Permanent Shear Stability Index

Permanent Shear Stability Index (PSSI) is measured according to ASTM 6022 at 100° C., which is herein incorporated by reference.

Percent Viscosity Loss

Percent viscosity loss (PVL) is measured according to ASTM 6288 at 100° C., which is herein incorporated by reference.

Mini-Rotational Viscometry

Mini-Rotational Viscometry (MRV) is measured according to ASTM D3928 and D4684, both of which are herein incorporated by reference.

Cold Cranking Simulation

Cold Cranking Simulation is performed according to ASTM 5293, which is herein incorporated by reference.

Catalysts

The term "overnight", if used, refers to a time of approximately 16-18 hours, the term "room temperature", refers to a temperature of 20-25° C., and the term "mixed alkanes" refers to a commercially obtained mixture of $C_{6-9}$ aliphatic hydrocarbons available under the trade designation Isopar E®, from ExxonMobil Chemical Company. In the event the name of a compound herein does not conform to the structural representation thereof, the structural representation shall control. The synthesis of all metal complexes and the preparation of all screening experiments are carried out in a dry nitrogen atmosphere using dry box techniques. All solvents used are HPLC grade and are dried before their use.

MMAO refers to modified methylalumoxane, a triisobutylaluminum modified methylalumoxane available commercially from Akzo-Noble Corporation.

Cocatalyst 1 A mixture of methyldi($C_{14-18}$ alkyl)ammonium salts of tetrakis(pentafluorophenyl)borate (here-in-after armeenium borate), prepared by reaction of a long chain trialkylamine (Armeen™ M2HT, available from Akzo-Nobel, Inc.), HCl and Li[$B(C_6F_5)_4$], substantially as disclosed in U.S. Pat. No. 5,919,9883, Ex. 2.

Cocatalyst 2 Mixed $C_{14-18}$ alkyldimethylammonium salt of bis(tris(pentafluorophenyl)-alumane)-2-undecylimidazolide, prepared according to U.S. Pat. No. 6,395,671, Ex. 16.

Examples 1 and 2, Comparative Example A, Continuous Solution Polymerization, Catalyst A1/DEZ (as Shuttling Agent)

Ethylene/propylene copolymers are prepared using two continuous stirred tank reactors (CSTR) connected in series. Each reactor is hydraulically full and set to operate at steady state conditions. The shuttling agent (SA1) is added to the first reactor along with catalyst A-1, Cocatalyst 1, a scavenger (triisobutylaluminum modified methylalumoxane MMAO, available from Akzo-Nobel, Inc.), and solvent (mixed alkanes (Isopar™ E, available from ExxonMobil Chemicals, Inc.). Operating conditions for the two reactors are provided in Tables 1 and 2. Polymer properties are provided in Table 3.

Examples 5-12

Examples 5-12 are manufactured using a non-adiabatic polymerization system consisting of two recirculating loop reactors configured in series. The shuttling agent (SA1) is added to the first reactor along with catalyst A-1, Cocatalyst 1, a scavenger (triisobutylaluminum modified methylalumoxane MMAO, available from Akzo-Nobel, Inc.), and solvent (mixed alkanes (Isopar™ E, available from ExxonMobil Chemicals, Inc.). Operating conditions for the two reactors are provided in Tables 1 and 2. Polymer properties are provided in Table 3.

Comparative Example B is Paratone 8941(ExxonMobil Chemical Co.) and Comparative Example C is Nordel IP 225 (The Dow Chemical Company).

TABLE 1

Process Conditions First CSTR or Loop Reactor

| Run | Solv. kg/hr | $C_2H_4^1$ kg/hr | $C_3H_6^1$ kg/hr | $H_2$ sccm[2] | T °C. | Cat. A-1 Conc mmol/kg | Cat. A-1 Flow kg/hr | Cocat. Conc. mmol/kg | Cocat flow kg/hr | MMAO Conc mmol/kg | MMAO Flow kg/hr | SA1 Conc mmol/kg | SA1 Flow kg/hr | Conv.[4] | R-1 Split[5] |
|---|---|---|---|---|---|---|---|---|---|---|---|---|---|---|---|
| A* | 22 | 1.84 | 0.75 | 160 | 107 | 0.5 | 0.21 | 0.252 | 0.5 | 2 | 0.1 | — | — | | 61 |
| 1 | 22 | 1.84 | 0.75 | 0 | 105 | 0.5 | 0.21 | 0.25 | 0.5 | — | — | 153[3] | 0.142 | | 61 |
| 2 | 25.5 | 2 | 1.1 | 0 | 105 | 0.5 | 0.245 | 0.286 | 0.5 | — | — | 153[3] | 0.12 | | 80 |

TABLE 1-continued

Process Conditions First CSTR or Loop Reactor

| Run | Solv. kg/hr | $C_2H_4^1$ kg/hr | $C_3H_6^1$ kg/hr | $H_2$ sccm$^2$ | T °C. | Cat. A-1 Conc. mmol/kg | Cat. A-1 Flow kg/hr | Cocat. Conc. mmol/kg | Cocat. flow kg/hr | MMAO Conc mmol/kg | MMAO Flow kg/hr | SA1 Conc mmol/kg | SA1 Flow kg/hr | Conv.$^4$ | R-1 Split$^5$ |
|---|---|---|---|---|---|---|---|---|---|---|---|---|---|---|---|
| 3 | 25.5 | 1.92 | 1.4 | 0 | 107 | 1 | 0.125 | 1 | 0.132 | — | — | 153$^3$ | 0.125 | 88.6 | 79 |
| 4 | 25.5 | 2.1 | 1.4 | 0 | 111 | 1 | 0.13 | 1 | 0.156 | — | — | 153$^3$ | 0.146 | 69.7 | 68 |
| 5 | 173.6 | 21.7 | 28.6 | 0 | 95 | 1.68 | 0.63 | 5.81 | 0.27 | 40.5 | 0.38 | 458 | 0.42 | 84.2 | 64 |
| 6 | 188.6 | 18.8 | 18.3 | 0 | 104 | 1.68 | 0.55 | 5.81 | 0.31 | 40.5 | 0.42 | 458 | 0.31 | 91.1 | 64 |
| 7 | 180.4 | 17.7 | 13.4 | 0 | 105 | 1.68 | 0.55 | 5.81 | 0.32 | 40.5 | 0.44 | 458 | 0.33 | 89.9 | 52 |
| 8 | 180.5 | 17.6 | 18.8 | 0 | 104 | 1.68 | 0.54 | 5.81 | 0.31 | 40.5 | 0.42 | 458 | 0.31 | 89.7 | 55 |
| 9 | 168.4 | 15.2 | 19.4 | 0 | 103 | 1.68 | 0.54 | 5.81 | 0.30 | 40.5 | 0.42 | 458 | 0.30 | 89.5 | 53 |
| 10 | 115.4 | 8.7 | 23.7 | 0 | 105 | 1.68 | 0.47 | 5.81 | 0.27 | 40.5 | 0.44 | 458 | 0.32 | 87.6 | 39 |
| 11 | 180.4 | 17.5 | 20.5 | 0 | 105 | 1.68 | 0.56 | 5.81 | 0.24 | 40.5 | 0.45 | 458 | 0.33 | 89.9 | 55 |
| 12 | 180.5 | 17.5 | 20.5 | 25.6 | 105 | 1.68 | 0.55 | 5.81 | 0.24 | 40.5 | 0.43 | 458 | 0.31 | 91.3 | 56 |

*Comparative, not an example of the invention.
$^1$Total flow (recycle + fresh, Ex. 5-12)
$^2$Standard cm$^3$/min
$^3$The DEZ solution also contains 1-5 mol percent of MMAO.
$^4$Percent ethylene conversion in reactor.
$^5$Percent of polymer produced in reactor 1.

TABLE 2

Process Conditions Second CSTR or Loop Reactor.

| Ex. | Solv. kg/hr | $C_2H_4$ kg/hr | $C_3H_6$ kg/hr | $H_2$ sccm$^1$ | T °C. | Cat. A-1 Conc. mmol/kg | Cat. A-1 Flow kg/hr | Cocat. Conc. mmol/kg | Cocat. Flow kg/hr | MMAO Conc mmol/Kg | MMAO Flow kg/hr | Conv.$^2$ | R-2 Split$^3$ | Rate kg/hr |
|---|---|---|---|---|---|---|---|---|---|---|---|---|---|---|
| A* | 13 | 0.95 | 2.7 | 0 | | 0.5 | 0.08 | 0.5 | 0.096 | 2 | 0.1 | | 39 | |
| 1 | 14 | 0.88 | 2.7 | 0 | | 0.5 | 0.08 | 0.5 | 0.096 | 2 | 0.1 | | 39 | |
| 2 | 5 | 0 | 1 | 0 | | 0.5 | 0.08 | 0.5 | 0.06 | 2 | 0.08 | | 20 | |
| 3 | 5.5 | 0.2 | 1 | 0 | 109 | 1 | 0.056 | 1 | 0.064 | 3.06 | 0.08 | | 21 | 3 |
| 4 | 10.5 | 0.4 | 1.75 | 0 | 106 | 1 | 0.065 | 1 | 0.078 | 2 | 0.05 | | 32 | 3 |
| 5 | 44.7 | 6.1 | 17.1 | 0 | 105 | 1.68 | 0.146 | 5.81 | 0.063 | 40.55 | 0 | 76.3 | 36 | 38 |
| 6 | 50.6 | 9.5 | 27.6 | 0 | 105 | 1.68 | 0.163 | 5.81 | 0.138 | 40.55 | 0 | 73.9 | 36 | 39 |
| 7 | 56.9 | 10.0 | 29.7 | 0 | 106 | 1.68 | 0.189 | 5.81 | 0.163 | 40.55 | 0 | 82.5 | 48 | 39 |
| 8 | 56.6 | 10.0 | 30.8 | 0 | 110 | 1.68 | 0.215 | 5.81 | 0.185 | 40.55 | 0 | 81.7 | 45 | 41 |
| 9 | 57.2 | 10.0 | 30.8 | 0 | 109 | 1.68 | 0.224 | 5.81 | 0.193 | 40.55 | 0 | 83.0 | 47 | 41 |
| 10 | 131.0 | 19.5 | 7.5 | 0 | 115 | 1.68 | 0.421 | 5.81 | 0.362 | 40.55 | 0 | 88.1 | 61 | 40 |
| 11 | 54.4 | 10.3 | 31.5 | 0 | 105 | 1.68 | 0.182 | 5.81 | 0.156 | 40.55 | 0 | 78.2 | 45 | 42 |
| 12 | 52.6 | 10.3 | 31.4 | 47.2 | 105 | 1.68 | 0.166 | 5.81 | 0.142 | 40.55 | 0 | 81.0 | 44 | 42 |

*Comparative, not an example of the invention.
$^1$Total feed (carryover + fresh, ex. 5-12).
$^2$Percent ethylene conversion in reactor 2.
$^3$Percent of polymer produced in reactor 2.

TABLE 3

Polymer Characterization Data

Dual reactor products

| Run | Wt % Ethylene (FTIR) | Wt % Ethylene (NMR) | Mooney 125° C., ML 1 + 4 | $I_2^2$ (dg/min) | $I_{10}/I_2$ | Mw (g/mol) | Mn (g/mol) | Mw/Mn | Tm (°C.) | ΔHfusion (J/g) | Tc (°C.) |
|---|---|---|---|---|---|---|---|---|---|---|---|
| A* | 65.6 | — | 13 | 1.8 | 6.1 | 112900 | 58820 | 1.9 | 40 | 43.1 | 24.5 |
| 1 | 66.3 | 63.5 | 18.7 | 1.2 | 6.0 | 91580 | 38070 | 2.4 | 35.6 | 43.3 | 35.6 |
| 2 | 64.6 | 64.6 | 16.5 | 1.4 | 6.3 | 116900 | 51150 | 2.3 | 23.0 | 42.5 | 12.5 |
| 3 | 67 | 66 | 24.4 | 0.8 | 5.9 | 116500 | 48900 | 2.4 | 39.7 | 42.2 | 24.6 |
| 4 | 65.1 | 63.5 | 24.5 | 0.8 | 5.9 | 111800 | 43720 | 2.6 | 38.5 | 37.1 | 24 |
| 5 | 66.9 | — | 25 | — | — | 120200 | 64740 | 1.9 | 39 | 34 | |
| 6 | 69.2 | — | 43.5 | — | — | 150600 | 68480 | 2.2 | 41 | 33 | |
| 7 | 68.6 | — | 43 | — | — | 147000 | 73890 | 2.0 | 57 | 34.5 | |
| 8 | 65.7 | — | 43.8 | — | — | 145400 | 67080 | 2.2 | | | |
| 9 | 58.2 | — | 39.5 | — | — | 143500 | 59180 | 2.4 | 41 | 28 | |
| 10 | 64.7 | — | 43.7 | — | — | 138900 | 61060 | 2.3 | 13 | 17 | |
| 11 | 64.2 | — | 40.4 | — | — | 145600 | 67540 | 2.2 | 35 | 22 | |
| 12 | 64.3 | — | 41.3 | — | — | 149100 | 70890 | 2.1 | 32 | 23 | |

TABLE 3-continued

Polymer Characterization Data

| Run | Wt % Ethylene (FTIR) | Wt % Ethylene (NMR) | Wt % C$_2$ Incorporation in Polymer from Reactor 1 | Wt % C$_2$ Incorporated in Polymer from Reactor 2 | Wt % Reactor 1 polymer made | Wt % Reactor 2 polymer made |
|---|---|---|---|---|---|---|
| A* | 65.6 | — | 72.2 | 50.0 | 61 | 39 |
| 1 | 66.3 | 63.5 | 72.2 | 50.0 | 61 | 39 |
| 2 | 64.6 | 64.6 | 72.2 | — | 80 | 20 |
| 3 | 67 | 66 | 71.4 | 50.0 | 79 | 21 |
| 4 | 65.1 | 63.5 | 71.4 | 50.0 | 68 | 32 |
| 5 | 66.9 | — | 69.6 | 50.3 | 64 | 36 |
| 6 | 69.2 | — | 72.5 | 45.2 | 64 | 36 |
| 7 | 68.6 | — | 80.4 | 50.0 | 52 | 48 |
| 8 | 65.7 | — | 70.1 | 47.6 | 55 | 45 |
| 9 | 58.2 | — | 69.4 | 48.0 | 53 | 47 |
| 10 | 64.7 | — | 48.4 | 70.1 | 39 | 61 |
| 11 | 64.2 | — | 68.2 | 46.9 | 55 | 45 |
| 12 | 64.3 | — | 67.2 | 46.8 | 56 | 44 |

Reactor 1 products

| Run | Wt % Ethylene (FTIR) | Wt % Ethylene (NMR) | Mw (g/mol) | Mn (g/mol) | Mw/Mn | Tm (° C.) | ΔH$_{fusion}$ (J/g) | Tc (° C.) |
|---|---|---|---|---|---|---|---|---|
| A* | 72.2 | 75.9 | 86440 | 31770 | 2.7 | 43.6 | 65.2 | 29.6 |
| 1 | 72.2 | 75.9 | 86440 | 31770 | 2.7 | 43.6 | 65.2 | 29.6 |
| 2 | 71.0 | 72.0 | 119900 | 58840 | 2.0 | 28.8 | 46.3 | 17 |
| 3 | 71.4 | 75.2 | 125000 | 59330 | 2.1 | 40.2 | 59.4 | 25.9 |
| 4 | 71.4 | 75.2 | 125000 | 59330 | 2.1 | 40.2 | 59.4 | 25.9 |

*comparative, not an example of the invention
$^2$dg/min

Lubricant Compositions

Lubricant compositions comprising each of the example polymers were formulated comprising the same base oil, i.e, Exxon FN1365 100LP. The ratio of the base oil to the polymer is 99:1 by weight for all lubricant compositions. Lubricant compositions were made from Comparative Examples A-E, Examples 1-4 and 11-13.

Testing of Lubricant Compositions

The lubricant compositions, i.e., Examples 1-2 and Comparative Example A, prepared above were tested for their kinematic viscosities, shear stabilities, shear stability indexes and viscosity losses.

engines that require 30-40SSI. In particular, it may be seen from Examples 1-2, that the lubricant composition can meet certain specifications for both high temperature performance and cold temperature performance. Examples of such specifications include the results from Examples 1 and 2. As shown, the thickening efficiency is in the range of approximately cSt, and the shear stability index is 32-35 SSI. For low temperature performance, it is desirable that the MRV be below 60,000 cP with little or no yield stress. In addition, under cold cranking simulation, the viscosity should not be more than 6600 cP. As shown, Examples 1 and 2 meet the cold temperature specifications for the MRV and CCS testing.

TABLE 12A

Test Results of Comparative Examples E-H, Examples 5-8

| Example | Thickening Efficiency (100° C., cSt) | PSSI (%) | MRV (cP at 35° C.) | MRV Yield Stress (g) | CCS (cP at −30° C.) |
|---|---|---|---|---|---|
| A* | 9.8 | 33.2 | 67842 | <105 | 6397 |
| 1 | 10.7 | 34.6 | 31900 | None | 5810 |
| 2 | 10.3 | 31.9 | 38700 | None | 5470 |
| TNZ MP572A2 | 11.7 | 39.8 | 32100 | None | 6040 |
| TNZ MP572B | 11.4 | 39.2 | 38900 | None | 6190 |
| R02 | 11.7 | 34.5 | 36000 | None | 6000 |
| R03 | 13.7 | 46.2 | 38270 | None | 5970 |
| R4a | 13.6 | 43.8 | 50480 | None | 6200 |
| R4b | 13.4 | 46.7 | — | — | — |
| R4c | 12.9 | 45.5 | 43280 | None | 6040 |
| R5a | 12.9 | 45.6 | 24140 | None | 6100 |
| R5c | 13.0 | 44.9 | — | — | — |
| R6 | 13.1 | 46.2 | 38370 | None | 6050 |

*Comparative example, not of the invention.

As may be seen from the data above, lubricant compositions of the present invention meet performance specifications for various motor oils used in for mid heavy duty In addition to the improvement in low temperature behavior (low viscosities for CCS and MRV), these inventive examples have improved solubility in oil. Improvement in the solubility of copolymers in oils at ambient or subambient temperatures is a benefit in keeping these polymers in solution to prevent gelation, sedimentation, or agglomeration of these polymers out of solution. Having long term solubility over long periods of time or a range of temperatures improves the bulk handling of Viscosity Index Improver concentrates which have typical concentrations between 1 and 10 wt % polymer in oil.

As described above, embodiments of the invention provide various lubricant compositions based on the disclosed ethylene/α-olefin interpolymers as viscosity modifiers for all type of oils and lubricants. These include motor oil, transmission fluids, gear oil, etc. These novels polymers could also be used in other hydrocarbons such as diesel fuel, both natural and synthetic, hydraulic fluids and other oils including petroleum derived products, synthetic oil and natural oils. The ethylene/α-olefin interpolymers can provide a similar benefit in properties as the styrenic block copolymers, such as KRATON®. These ethylene/α-olefin interpolymers can be used to thicken motor oil. They offer the possibility of improved low temperature performance and good flexibility in formulating motor oil, gear lubricates and greases. By controlling the block distribution of these polymers, low temperature performance can be optimized and the undesirable oil and wax interactions can be avoided. By controlling the level of cystallinity, the polymer product form can be varied from pellets to bales. Additional advantages and characteristics are apparent to those skilled in the art.

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. A lubricant composition comprising:
   (i) a base oil; and
   (ii) an ethylene/α-olefin interpolymer, wherein the ethylene/α-olefin interpolymer comprises two or more intramolecular segments or blocks characterized by possessing a most probable molecular weight distribution, wherein the ethylene/α-olefin interpolymer comprises a hard segment and a soft segment, and:
   (a) has a Mw/Mn from about 1.7 to about 3.5;
   (b) has an ethylene content in the hard segment in the range of from 70 wt % to 85 wt % based on based on total monomer content in hard segment;
   (c) (i) has a hard segment in an amount of at least 40%, at least one melting point, Tm, in degrees Celsius and an amount of ethylene in weight percent, wt % $C_2$, wherein the numerical values of Tm and wt % $C_2$ correspond to the relationship:

$$90° C. \geq Tm \geq 4.1276(\text{wt \% } C_2) - 244.76;$$

or (ii) has a hard segment composition of less than 40%, at least one melting point, Tm, in degrees Celsius and an amount of ethylene in weight percent, wt % $C_2$, wherein the numerical values of Tm and wt % $C_2$ correspond to the relationship:

$$80° C. \geq Tm \leq 4.1276(\text{wt \% } C_2) - 264.95;$$

or (iii) is characterized by an average block index greater than zero and up to about 1.0; or
   (iv) has a molecular fraction which elutes between 0° C. and 130° C. when fractionated using low temperature TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or
   (v) has a relationship between ethylene content in wt % and log molecular weight such that a line plotted of ethylene content vs log molecular weight as measured by GPC-IR has an absolute slope, m, of equal to or less than 4; and,
   (d) has a turbidity measurement of a 1.0 wt % solution of the ethylene/α-olefin interpolymer in oil or a 1.5 wt % solution in dodecane of less than or equal to that of a comparable copolymer wherein the comparable copolymer has the same DSC enthalpy (J/g) at greater than 55° C. within ±5 J/g and the same overall ethylene content within 10%; and,
   has a soft segment comprising 35 wt % to 80 wt % comonomer.

2. The lubricant composition of claim 1, wherein the α-olefin is styrene, propylene, 1-butene, 1-hexene, 1-octene, 4-methyl-1-pentene, norbornene, 1-decene, 1,5-hexadiene, or a combination thereof.

3. The lubricant composition of claim 1, wherein the base oil is selected from the group consisting of the base stocks of API Groups I, II, III, IV and V and combinations thereof.

4. The lubricant composition of claim 1, wherein the base oil is a natural oil, a synthetic oil or a combination thereof.

5. The lubricant composition of claim 1, wherein the lubricant composition further comprises at least an additive.

6. The lubricant composition of claim 5, wherein the additive is a detergent, a dispersant, a friction modifier, a pour point depressant, a demulsifier, an anti-foam, a corrosion inhibitor, an anti-wear agent, an antioxidant, a rust inhibitor, a thickener or a combination thereof.

7. The lubricant composition of claim 1, wherein the lubricant composition is a motor oil, a transmission fluid, a gear oil, a power steering fluid, a shock absorber fluid, a brake fluid, a hydraulic fluid or a grease.

8. The lubricant composition of claim 7, wherein the lubricant composition is a motor oil.

9. The lubricant composition of claim 8, wherein the motor oil further comprises a pour point depressant, a detergent, a dispersant, an anti-wear, an antioxidant, a friction modifier, a rust inhibitor or a combination thereof.

10. The lubricant composition of claim 7, wherein the lubricant composition is a transmission fluid.

11. The lubricant composition of claim 10, wherein the transmission fluid further comprises a friction modifier, a detergent, a dispersant, an antioxidant, an anti-wear agent, an extreme pressure agent, a pour point depressant, an anti-foam, a corrosion inhibitor or a combination thereof.

12. The lubricant composition of claim 7, wherein the lubricant composition is a gear oil.

13. The lubricant composition of claim 12, wherein the gear oil further comprises an anti-wear, an extreme pressure agent, a rust inhibitor or a combination thereof.

14. The lubricant composition of claim 7, wherein the lubricant composition is a grease.

15. The lubricant composition of claim 14, wherein the grease further comprises a thickener, a complexing agent, an antioxidant, an anti-wear agent, an extreme pressure agent, an anti-foam, a corrosion inhibitor or a mixture thereof.

* * * * *